June 16, 1936.     H. KÄMMEL     2,044,530
CODE WRITING MACHINE
Filed Jan. 30, 1931     20 Sheets-Sheet 1

Inventor
H Kämmel
By Marks & Clerk
Attys

June 16, 1936.  H. KÄMMEL  2,044,530
CODE WRITING MACHINE
Filed Jan. 30, 1931  20 Sheets-Sheet 3

Inventor
H. Kämmel
By Marks Clark
Attys.

June 16, 1936.    H. KÄMMEL    2,044,530
CODE WRITING MACHINE
Filed Jan. 30, 1931    20 Sheets-Sheet 6

Inventor
H Kämmel
By Marks Clerk
Attys.

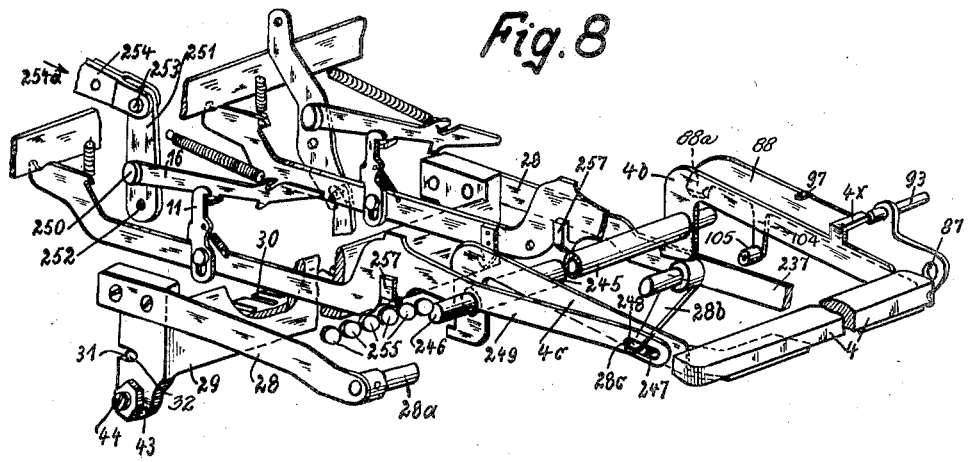
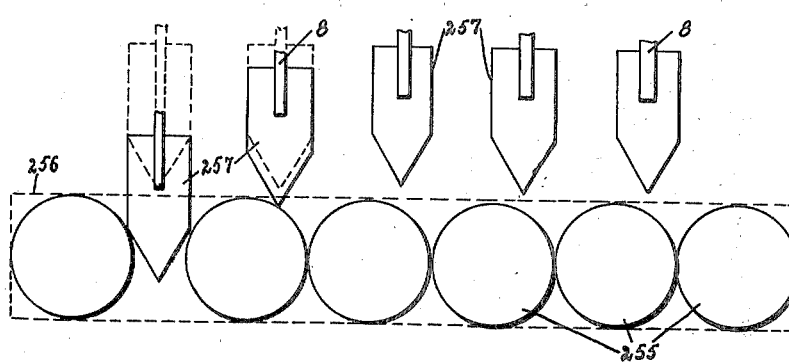

June 16, 1936.     H. KÄMMEL     2,044,530
CODE WRITING MACHINE
Filed Jan. 30, 1931     20 Sheets-Sheet 9
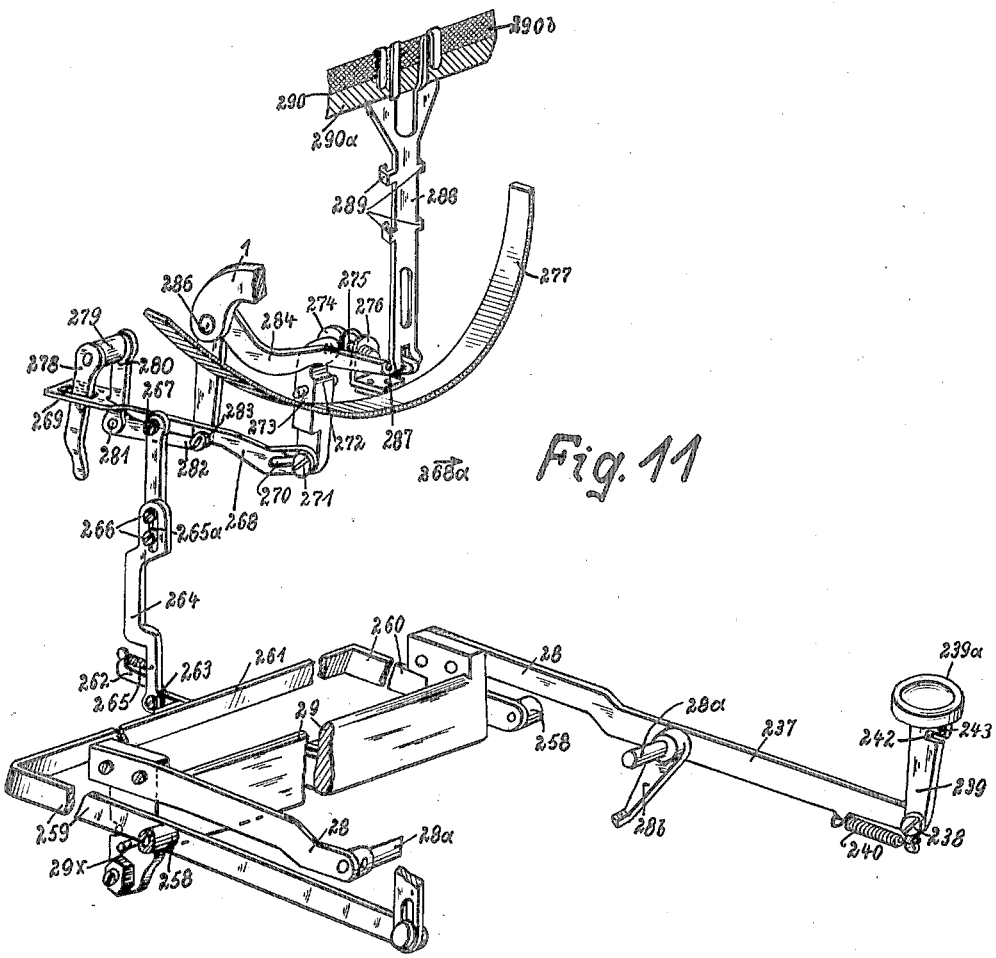
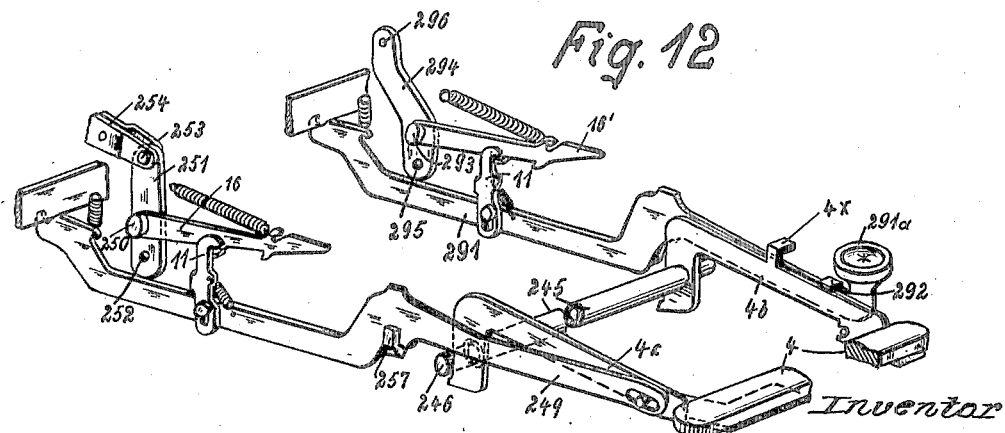

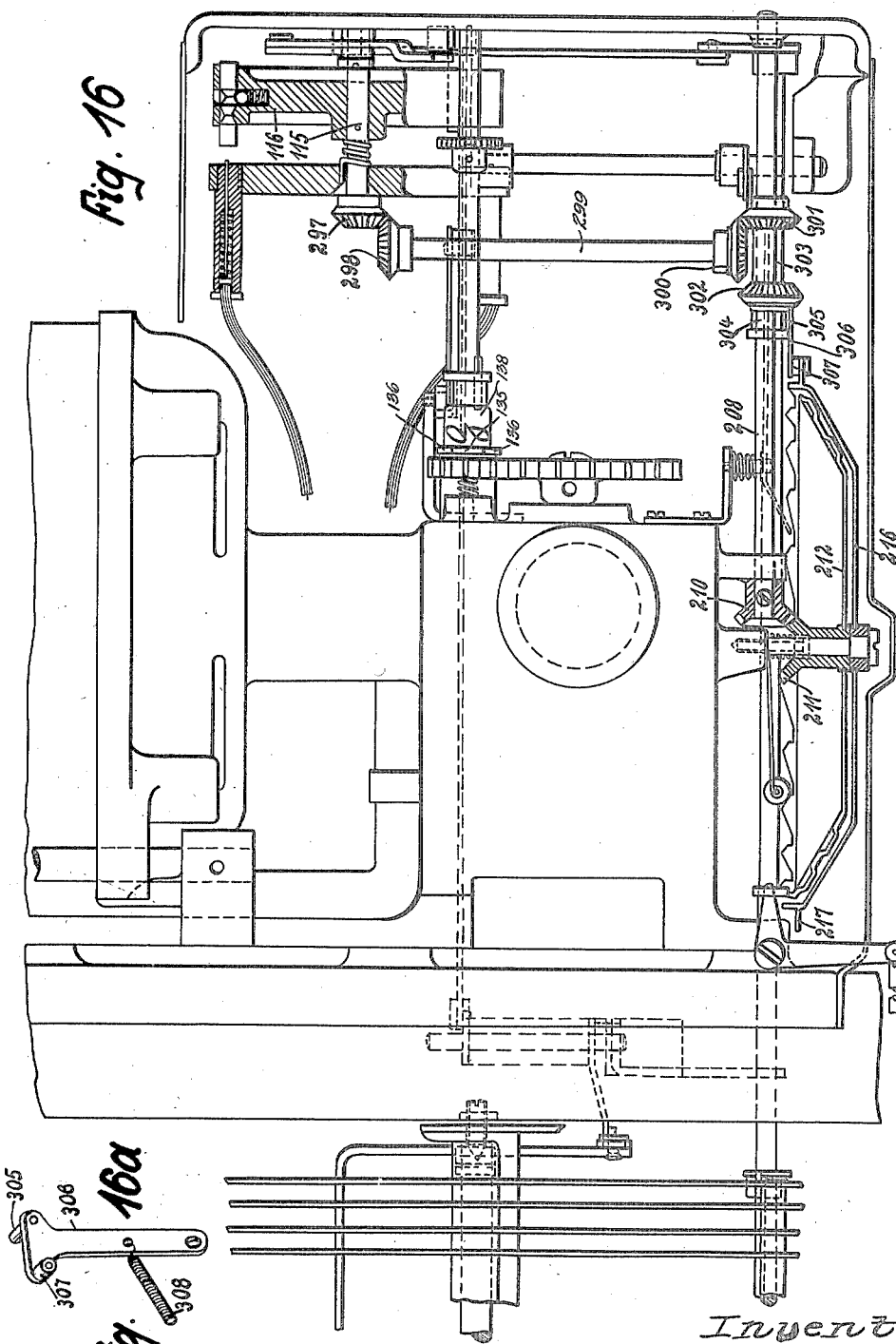

Inventor
H. Kämmel
By Mark T Clark
Attys.

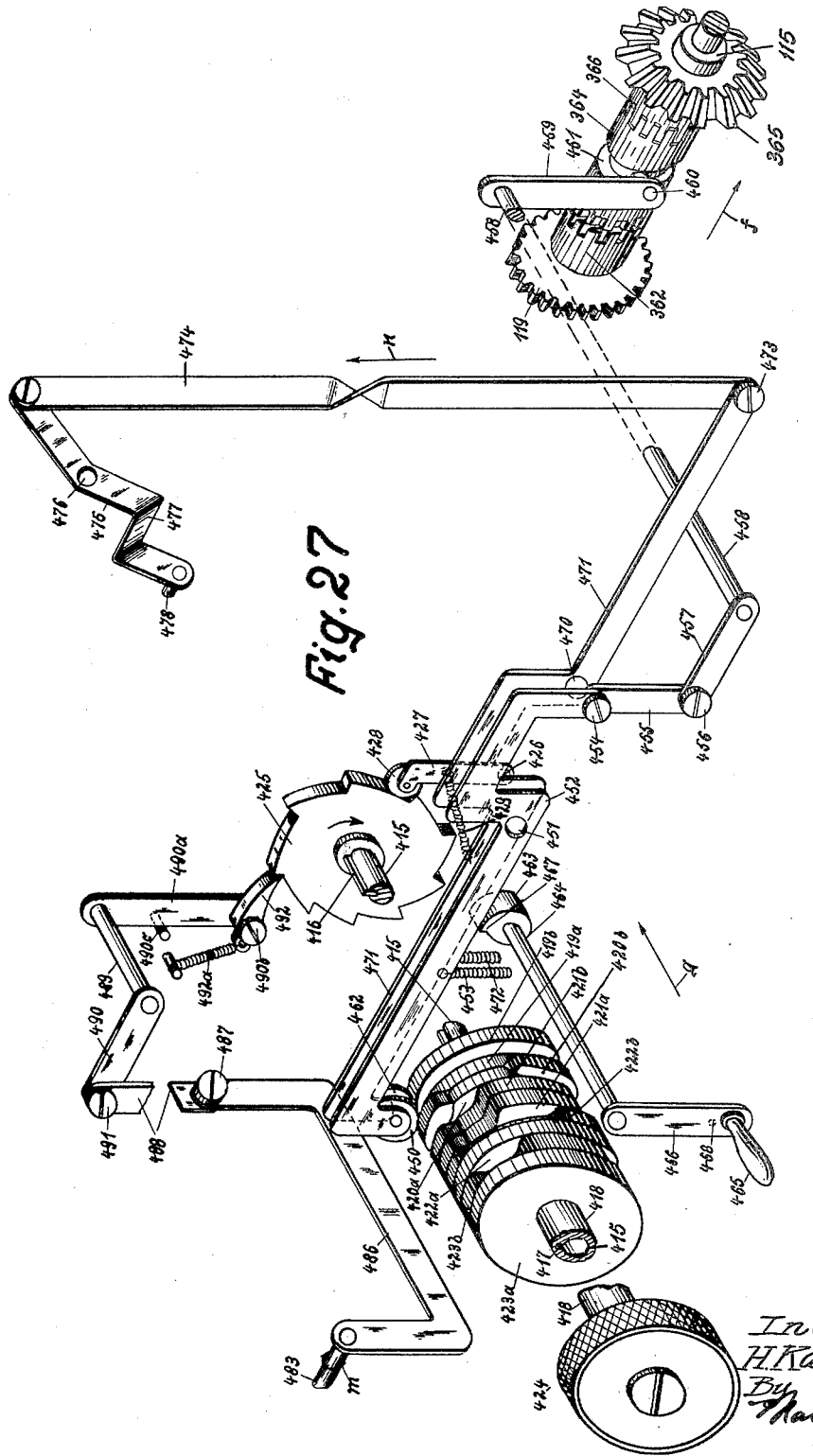

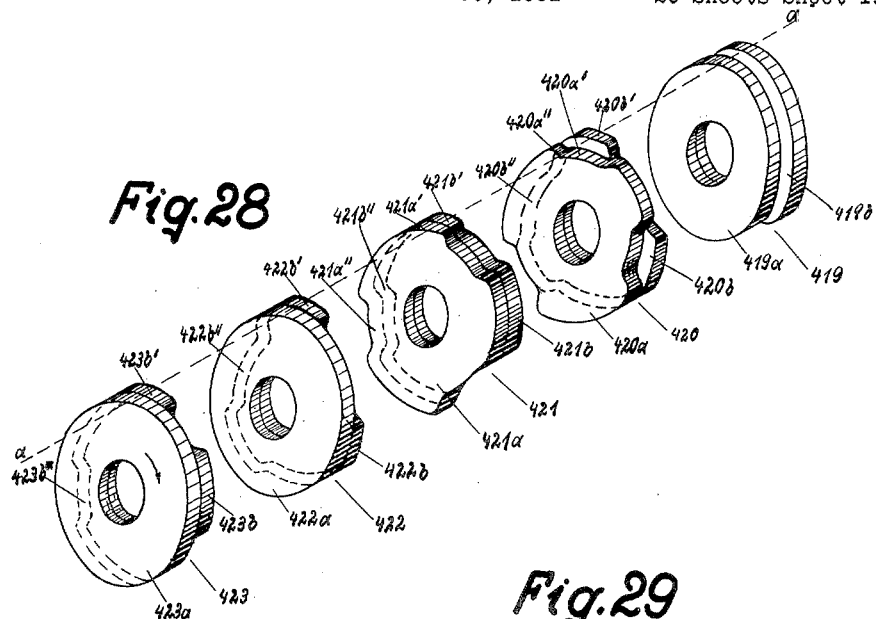

Patented June 16, 1936

2,044,530

UNITED STATES PATENT OFFICE 2,044,530

CODE WRITING MACHINE

Hugo Kämmel, Zella-Mehlis, Germany, assignor to Mercedes Büromaschinen-Werke Aktiengesellschaft, Thuringia, Postamt Zella-Mehlis, Germany, Herbert Hinrichs, Hamburg, Germany, and Paul Peroti, London, England Application January 30, 1931, Serial No. 512,433
In Germany February 1, 1930

42 Claims. (Cl. 197—4)

This invention relates to a code writing machine and the like, and according to the invention the machine in question is furnished with a device for the automatic selection of control signs for telegraphic code words.

By means of the invention, it is possible to ascertain for code words, special control signs, for example: control letters, which in the case of erroneous recording of the code word, whether upon despatch of the telegram or upon receipt thereof, enables the correct code word to be more readily found.

As is well known, the object of code words is to convert a sentence or several sentences, phrases or other indications into short-word form in order to reduce telegram expenses.

In the course of time, various code systems have accordingly been developed, with the assistance of which, the information to be communicated by telegram is converted into abbreviated or code form.

Generally speaking, these codes are recorded into the form of dictionaries. Large concerns have even produced their own private codes particularly adapted to the nature of their business, in which in many instances, in order to effect the greatest possible economy, the information is expressed by a single group or by multiple groups of letters or numbers, which in turn are composed to form code words, or in which the groups of figures are converted into code words, respectively.

Clerical errors of any kind in the case of these code words are incapable of being corrected by the logical formation of a word.

According to the invention, this is performed, as set forth above, by the addition of a control sign which discloses whether the code word has been correctly written and enables the word to be corrected. For automatic determination of the control letter, the machine is furnished with a device moved automatically by the letter selecting member and consisting of a self-contained element, such for example as a disc or an endless band, which device is furnished with a series of letters and is moved in varying direction in relation to an indicator in accordance with the value of the particular letter developed. The element may also be furnished with two oppositely directed series of letters and moved in the one direction in relation to an indicator in accordance with the letter selected, with, however, alternate actuation of a mark or the like. The letter which after the selection of all letters or the writing thereof respectively, is situated in the operative position in relation to the indicator constitutes the desired control letter.

Certain forms of embodiment of the arrangement according to the invention are illustrated by way of example in the accompanying drawings.

Figure 1a shows a detail in Figure 1.

Figure 2a shows a detail in perspective.

Figure 3a shows a perspective view of a detail.

Figure 4a shows a detail on Figure 4 in elevation taken in the direction of the arrow "$x$" in Figure 4.

Figure 5a shows a side view of the device according to Figure 5, the mechanism being shown in another position.

Figure 8 is a perspective view of the mechanism according to Figure 6, in connection, however, with the space key.

Figure 8a is a front view of a roller locking means for the key levers on an enlarged scale.

Figure 11 is a perspective view of the parts of the mechanism shown in Figure 9 and Figure 10, in conjunction with the ribbon reversing mechanism.

Figure 12 is a perspective view of a clear sign testing device in conjunction with the space key arrangement.

Figure 16 shows a simplified embodiment of the device according to Figures 1-8, more particularly with reference to Figure 4.

Figure 16a shows in perspective view, a detail of Figure 16.

Figure 27 shows a perspective view of the mechanism relating to the cypher device, the view being taken in the direction of the arrow "b" shown in Figure 1.

Figure 28 shows the control curve series in perspective illustrated in Figure 27, the parts for the sake of illustration being separated from one another.

Figure 29 shows a front view of the letter roller housing, part of which is cut away.

Figure 30 shows a section through the letter roller housing on the line 30—30 on Figure 29, viewed in the direction of the arrow "c".

Figure 31 shows a part of the letter roller housing with removed cover plate, parts being represented in section for better illustration.

Figure 36 shows a detail of a second example of toothed wheel roller, arranged in the letter roller housing in Figures 32 to 34, the view being taken in the direction of the arrow "s" in Figure 33.

Figure 37 shows a section through the line 37—37 in Figure 36.

Figure 1:
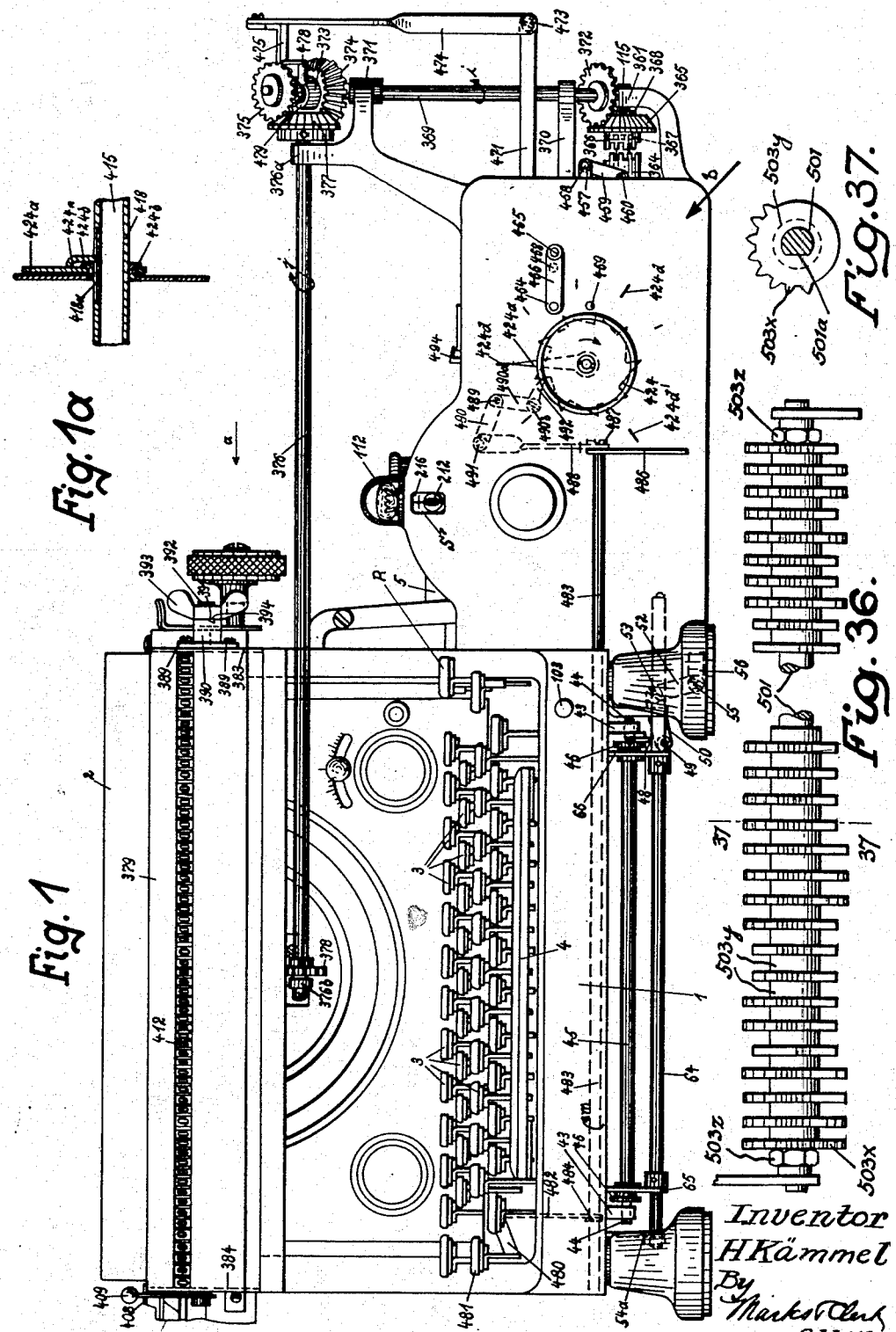
Figure 1 shows a front view of a power-driven typewriter in combination with a code-word testing and cypher device on a reduced scale.

The machine frame, 1, Figure 1, carries a paper carriage 2, which upon depression of a writing key, 3, or the space key, 4, respectively, advances on each occasion one step conforming with the distance of one letter from another from the right towards the left under the action of a tension spring which is not shown. When the paper carriage has moved into the extreme left-hand position, upon depression of the so-called carriage-returning key, the carriage is moved back automatically towards the right by a power drive in the manner usual in the case of power-driven typewriters.

For better comprehension of the device according to the invention there will be described in the first place, more particularly with reference to Figure 2, the essence of the power-actuated type lever drive.

Figure 2:
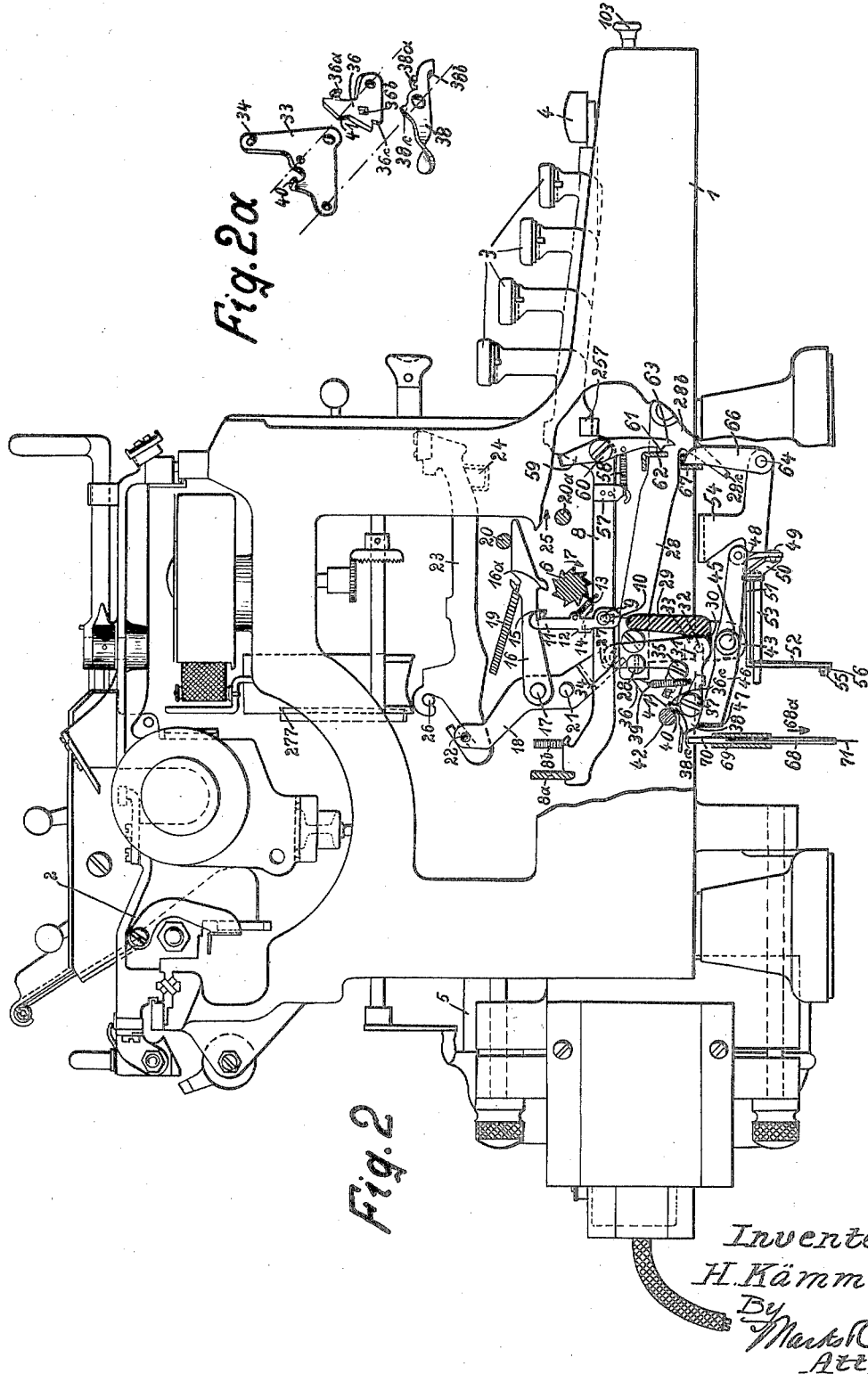
Figure 2 shows a side view of a machine according to Figure 1, in which for the sake of better illustration parts are represented cut away.

On the right-hand side wall of the typewriter, there is mounted an electric motor, 5, (Figure 4), which through the medium of a suitable transmission gear S, continuously rotates in the direction of the arrow, 7, a cam-shaft 6, Figure 2, the cam shaft being mounted so as to be rotatable in the machine frame, 1. On each key lever, 8, there is fitted, by means of a pin, 9, a displaceable operating hook, 11, which is furnished with a longitudinal slot, 10, and also possesses a lug, 12, bent off at right angles.

Under the pull of a tension spring, 13, which engages on the one hand with the key lever, 8, and on the other hand with the operating hook, 11, the operating hook with its lug, 12, is drawn against an abutment, 14, on the key lever, 8, this determining the normal position thereof. The upper hook-shaped end of the operating hook, 11, co-operates with the projection, 15, of a tension lever, 16, which by means of a pin, 17, is pivoted to an intermediate lever, 18, and by means of a tension spring, 19, is drawn against a stop, 20, common to all the tension levers, whereby at the same time the intermediate lever, 18, which is mounted to be oscillatory in the machine frame about an axis, 21, is also maintained in its position of rest by reason of the fact that its pin, 22, thrusts against a part of the type lever, 23, co-operating therewith. In this manner the type lever, 23, is also held in its position of rest by the tension spring, 19, engaging with the lever 16, in which position the type lever rests against the type-lever supporting member, 24, which is common to all the type levers.

If a key, 3, is depressed, the co-acting key lever, 8, will be moved about its fulcrum, 8a, against the action of the tension spring, 8b, in which movement the operating hook, 11, also participates. The operating hook, 11, thereof then acts on the projection, 15, of the hook, 16, so that the hook 16, is moved against the action of the spring, 19, clockwise about the axis of oscillation, 17, and moves the projection, 16a, into engagement with the continuously rotating cam shaft, 6. Consequently, the lever, 16, is moved in the direction of the arrow, 25, and causes a clockwise movement of the intermediate lever, 18, about its axis of oscillation, 21. This movement is transmitted by the intermediate lever, 18, through the medium of the pin, 22, to the type lever, 23, which accordingly performs an anticlock-wise oscillatory movement about the axis, 26, and strikes against the platen. The hook, 16, after the type lever, 23, has covered about four-fifths of the distance, is moved out of engagement with the cam shaft by reason of the fact that it strikes against the rod, 20a. The remaining distance up to the platen is covered by the type lever by reason of its momentum. The return of the parts, 16, 18, and 23, into the normal position as shown in Figure 2, is caused by the tension spring, 19.

For the purpose of employing the power driven mechanism used for typewriting and as described above for actuating the code-word testing device, according to the invention, the intermediate lever, 18, is extended in a downward direction. It may be particularly mentioned that only those intermediate levers, 18, are extended which are assigned to a letter-writing point and are required for the code-word testing device, and not those which belong to a figure or sign writing point. It will be obvious from this, that, conforming with the number of letters in the alphabet, only 25 points are furnished with downwardly extending intermediate levers. The letter "Q" being omitted as this letter may be easily changed with the letter "O".

The extensions of the intermediate levers are formed in fork-like fashion by the provision of a jaw, 27. Below the writing mechanism there is provided a carrier, 29, on two levers, 28, Figures 2 and 8-10, of which in the figures only one lever, viz: that on the right, is shown, the carrier, 29, being shown in section in Figure 2. The levers, 28, for the sake of greater clarity are merely indicated in Figure 2, and are shown fully in Figures 9 and 10, and described fully with reference to these figures at a later point. The carrier, 29, is furnished with transverse slots, 30, Figure 8, and a longitudinal groove, 31. The longitudinal groove, 31, carries an axle, 32, supporting angle levers, 33, Figures 2 and 6, each of which co-operates with a downwardly extended intermediate lever, 18, each lever, 33, being provided with a pin, 34, which is mounted on the upwardly directed arm and projects into the jaw, 27, of the co-acting intermediate lever 18. By means of the screw 35, there is pivoted to the lever, 33, a lever, 36, Figure 2a, and similarly by means of a screw, 37, a lever, 38.

Both levers, 36 and 38, are acted upon continuously, in an anti-clockwise manner, by means of a common tension spring, 39.

The tension spring, 39, engages with spring lugs, 36a, and 38a, Figure 2a. The normal position of the lever, 38, is occasioned by the fact that the same thrusts with its lug, 38b, from below against the horizontal arm of the lever, 33. The rearwardly extending end of the lever, 38, is set off to the extent of 90 degrees. A lug, 40, formed on the lever, 33, Figure 2a, penetrates into a recess 36b, of the lever, 36. By the thrust of the projection, 40, against the upper or lower edge of the recess, 36b, the movement of the lever, 36, is limited. The lever, 36, is furnished with an edge, 41, Figures 2 and 2a, across the path of movement of which there projects an axle, 42, common to all the levers, 36. On each end of the carrier, 29, there is provided an eye, 43, Figures 1, 2, 3, and 8, between which, by means of threaded pins, 44, Figures 1, 3, 4, and 8, there is rotatably mounted an axle, 45. On the two ends of the axle, 45, there are riveted by means of suitable bosses, levers, 46, of which in Figures 2, 3, 4, and 6, only the right-hand one is to be seen.

Both levers, 46, are united to form a U-shaped member by means of a bridge, 47. The bridge, 47, passes below all levers, 38, and rests against the same. The right-hand lever, 46, is extended towards the front beyond the axis of oscillation, 45, Figures 2, 4, 6, and 9, and is in jointed connection with one end of a connecting link, 48, on the other end of which is pivotably connected by means of a screw, 49, a lever, 50. The lever, 50, Figures 2, 3, 4, and 7 is connected by means of a connecting member, 51, with a lever 52, the levers being mounted in common on an axle, 53, which in turn is carried by the frame, 1, by means of bearings, 54. On the downwardly projecting end, the lever, 52, is pivotably connected by means of a screw, 55, Figure 3, with a rod, 56, which is more particularly described later.

On each letter key lever, 8, there is provided a spring hook, 57, Figure 2, which is engaged by one end of a tension spring, 58, the other end of which is secured to a lever, 59. The lever, 59, is pivoted by means of a screw, 60, to the key lever 8. By means of the spring, 58, the lever 59, is continuously acted upon clockwise, so that the lever thrusts with its projection, 61, against an angular and fixed bar, 62. The lever, 59, also has a further projection, 63, the object of which will be described later. In the bearings, 54 and 54a, on the machine frame, Figures 1–4, there is rotatably mounted an axle, 64. To the axle, 64, there are riveted by means of suitable bosses, levers, 65 and 66, which by means of an angular bar, 67, are connected to form a U-shaped member.

Below the levers, 38, Figures 2 and 6, or below the set-off ends thereof respectively, there are provided so-called "Bowden" controls on which the levers, 38, are capable of acting. The "Bowden" control consists in substance of a flexible sleeve resembling a spiral spring, the one end, 68, of which is secured to a fixed bearing portion, 69. On the fixed bearing portion, 69, there is also provided in a displaceable manner, a bolt, 70, which is connected to one end of a steel wire, 71, passing through the sleeve, 68. Regarding the other end of the "Bowden" control, detailed reference will be made to this at a later point.

Figure 6:
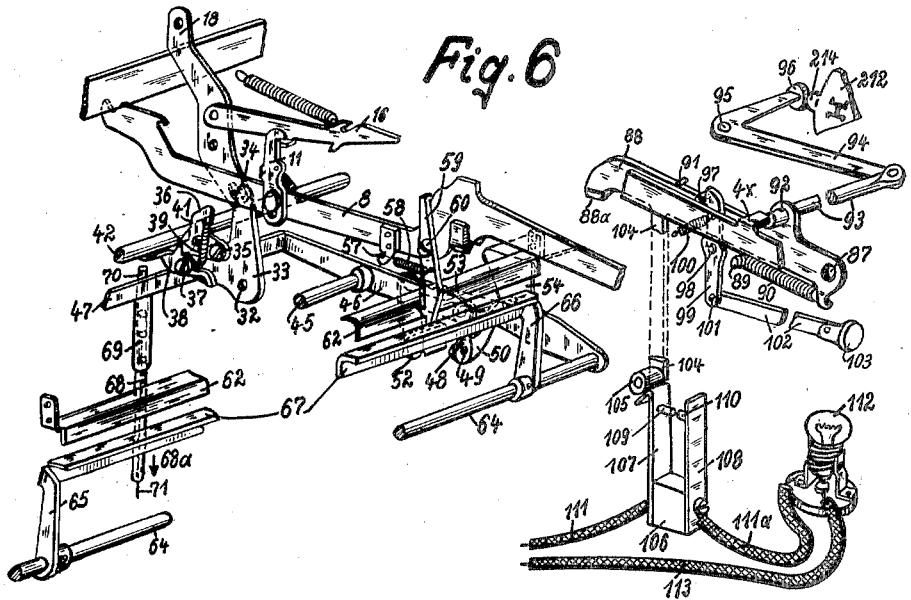
Figure 6 is a perspective view of the mechanism pertaining to the code word testing device, the mechanism being situated below the machine, in conjunction with the power-driven typewriter.

At the point, 87, Figures 6 and 8, there is pivoted on the right-hand side of the machine frame a lever, 88. The lever, 88, is continuously acted upon clockwise by a spring, 90, one end of which engages with the lever while the other end is secured to a fixed stud, 89, whereby the lever thrusts against a fixed stud, 91, which determines its position of rest. In an eye, 92, formed in the lever, 88, in which is mounted so as to be capable of longitudinal displacement, see also Figure 4, one end of a rod, 93, the other end of which is in jointed connection with one arm of an angle lever, 94. The angle lever, 94, is oscillatory about the point, 95, on the machine frame and carries on its other arm a rotatably mounted roll, 96, which co-operates with a projection on a letter disc, to be hereinafter described.

On the lever, 88, there is also a lug, 97, which is bent off at right angles to the lever. The lug, 97, co-operates with a lever, 99, which is mounted on a pin, 98, on the machine frame, so as to be oscillatory thereon, and is continuously acted upon anti-clockwise by a spring, 100. One end of the lever, 99, is connected by means of a pin 101, to one end of a rod, 102, which carries at its lower other end a finger button, 103. This button, 103, projects out of the front of the machine frame. The downward movement of the lever, 88, is limited by the stud, 89, which is also engaged by the spring, 90.

A downwardly projecting bar, 104, on the lever, 88, which for purposes of illustration is shown in Figure 6, partly broken off and somewhat displaced in a downward direction, carries a roll, 105, composed of insulating material. The roll, 105, acts on an electric switch, which is of the following kind.

On an insulating member, 106, there are secured two resilient strips of metal, 107 and 108, which are preferably composed of brass and carry on their upper parts, pins, 109 and 110. The spring, 107, at its upper end is bent off inclinedly in a downward direction. With this inclined portion there co-operates the roll, 105, above described, composed of insulating material. The pins, 109 and 110, of the springs, 107 and 108, do not normally touch each other but are disposed at a certain distance apart.

This electric switch is connected across a circuit which is constituted by a lead, 111, 111a, an electric lamp 112, and a lead, 113. Normally the circuit is broken at the contact pins, 109 and 110. If, however, in a manner to be described later, the roll, 105, moves over the inclined portion of the spring 107, and presses this spring towards the spring, 108, the pins, 109 and 110, touch. In this manner the circuit is completed and the lamp, 112, caused to light.

On the machine frame there is firmly secured a part, 114, in which one end of an axle, 115, is rotatably mounted. The axle, 115, carries a disc, 116, rigidly attached thereto and is mounted at its other end in the side wall, 117. By means of a bush, 118, which is provided between the disc, 116, and the side wall, 117, axial displacement of the axle, 115, towards the right is avoided, while displacement towards the left is prevented by the gear wheel, 119, mounted on the axle, 115. The wheel, 119, is rotatably mounted on the shaft, 115, and may through a coupling device hereinafter described, be coupled at will in fixed relation to the shaft, 115. Meantime, in the following description, it is assumed that the wheel, 119, is in fixed relation to the shaft, 115. Between the disc, 116, and part, 114, there is mounted on the axle, 115, a compression spring, 120, which is secured against rotation by reason of the fact that one of its ends is angularly bent off and engages with a hole in the part, 114, while the other end presses against the disc, 116. The spring, 120, exerts a braking action on the disc, 116.

Figure 4:
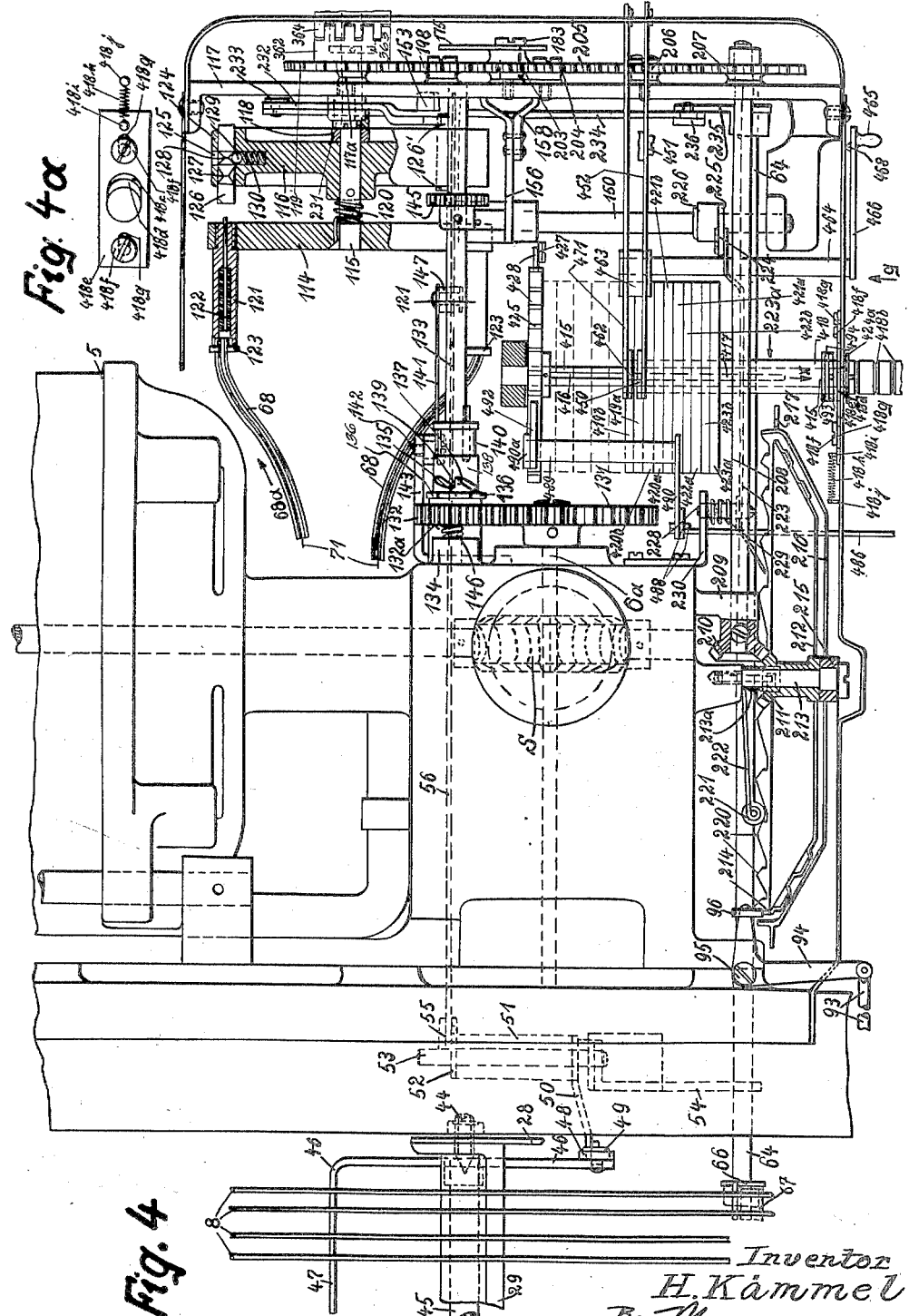
Figure 4 shows a plan of the machine to full size scale, with partly broken away casing.

In the part, 114, there are provided 25 bushes, 121, disposed circularly about the axle, 115, of which bushes in Figure 4, only two of them are shown. The bushes, 121, however, are not distributed uniformly around the circle. The pitch circle of disc 114 is, for the reason set forth later, divided into twenty-eight equal parts, and the bushes, 121, are so arranged that three parts side-by-side remain free. In each of the bushes, 121, there is arranged a pin, 122, which at the end remote from the part, 114, is furnished with a head. By means of a compression spring placed over its stem, the pin, 122, is acted upon continuously towards the left so that the head of the pin thrusts against the closing nut, 123, in which is secured the above-described spiral spring-like flexible sleeve, 68, of the "Bowden" control. The steel wire, 71, which has also been described above and is situated within the sleeve, 68, and which with one of its ends, Figure 2, is connected with the pin, 70, communicates at its other end with the pin, 122.

The disc, 116, is furnished with twenty-eight holes, 124, which are distributed evenly over a pitch circle which is equal in size to the pitch circle of the bushes, 121, described above. Vertically disposed in relation to the holes, 124, are holes, 125, which cross the holes, 124, in the manner illustrated in Figure 4. In the holes, 124, there are arranged longitudinally displaceable bolts, 126, which are furnished with two grooves, 127 and 128. In the hole, 125, there is arranged a ball, 129, which under the pressure of the spring 130, is capable of entering into one of the two grooves, 127 and 128. Normally the bolts, 126, assume the position in which the ball, 129, engages in the groove, 128. The disc 116 and the pins 126 form a so called value generator.

As already mentioned, the cam-shaft, 6, which actuates the writing mechanism, is driven by the electric motor, 5, through the medium of a suitable worm gear, 8, by means of which the circumferential velocity of the motor is reduced. The end portion, 6a, of the cam-shaft, 6, projects out of the machine frame, 1, on the right, Figure 4, and carries on this end a gear wheel, 131, which continuously engages with a gear wheel, 132. The gear wheel, 132, is mounted so as to be loosely rotatable on an axle, 133, which is mounted at one end in the boss, 134, and at the other end in the side wall, 117. The boss of the gear wheel, 132, is furnished with an annular groove, 135, which is engaged by the forked upper end of a part, 136, Figures 3 and 4. In this manner the gear wheel, 132, is secured against axial displacement. The end face of the boss of the gear wheel, 132, is furnished with teeth, 137, and forms in this manner the one half of a claw coupling. The other half of the coupling is constituted by a muff, 138, which is mounted on the shaft, 133, in such a manner as to be axially displaceable but incapable of rotation thereon and is provided with teeth, 139, correspondingly formed to and adapted to engage with the half, 137, of the coupling. The muff, 138, is furnished with an annular groove, 140, which is engaged by the upright arm of an angle lever, 141, Figures 3 and 4. The angle lever, 141, is pivoted by means of a screw, 142, to a lug, 143, secured to the machine frame. By means of the tension spring, 144, one end of which is attached to the lug, 143, while the other end is attached to the lever, 141, the latter is always acted upon anti-clockwise, and thus normally holds the two coupling parts, 137 and 138, in engagement.

On the axle, 133, there is furthermore rigidly mounted a pinion, 145, which co-operates with the bolts, 126, of the disc, 116, in the manner described later. The left-hand end of the shaft, 133, is reduced to a slight extent approximately up to the face, 132a, of the wheel, 132, so that at this point a shoulder is formed. Between this shoulder and the boss, 134, of the machine frame, there is mounted on the shaft, 133, a compression spring, 146, which is secured against rotation by the engagement of one of its ends which is angularly bent off, in a corresponding hole in the boss, 134. The spring, 146, exerts a braking action on the shaft, 133.

Figure 3:
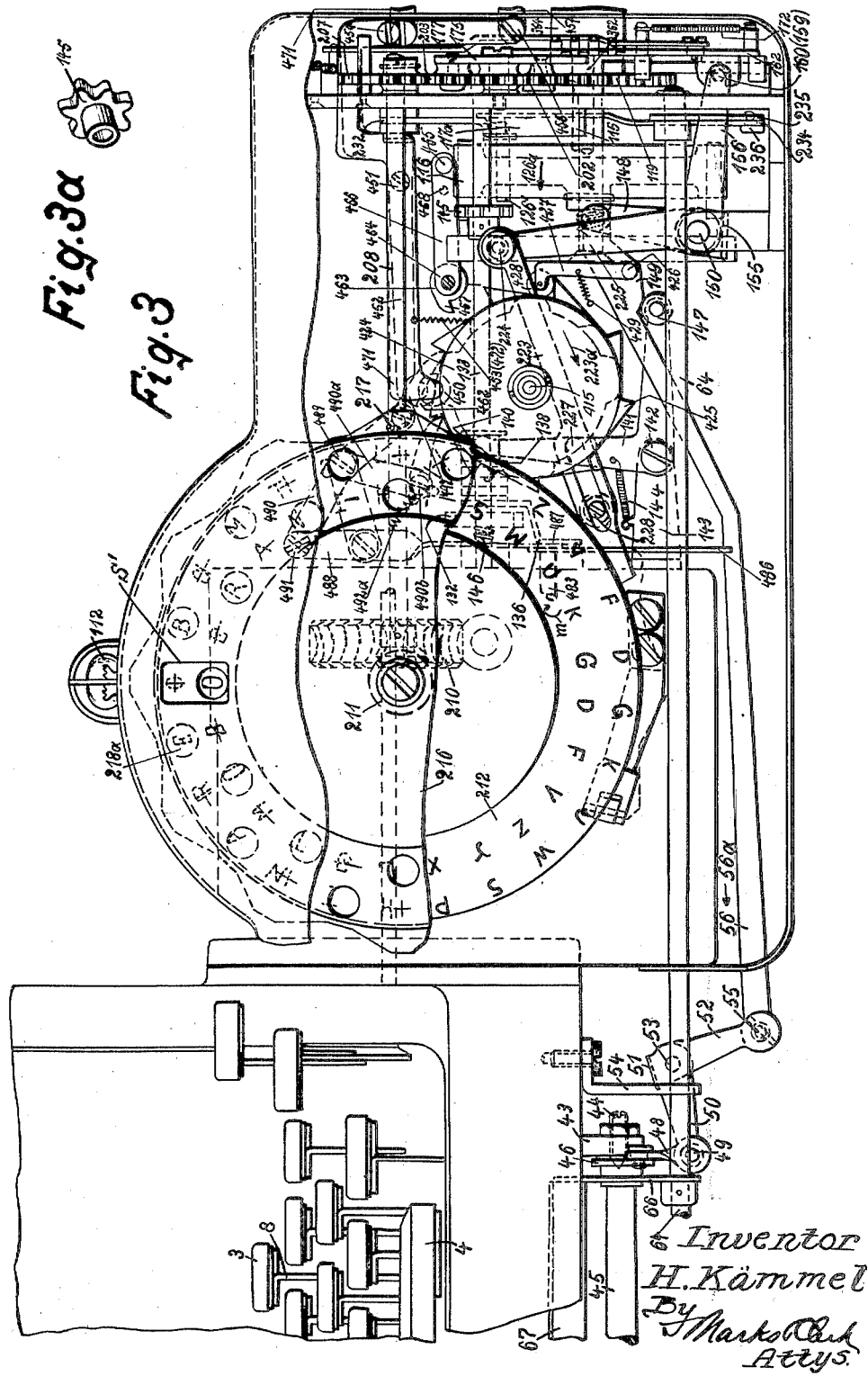
Figure 3 shows a front view towards the right of the code and cypher device on the typewriter, to full size scale, in which for the sake of better illustration, parts are represented broken away, the casing also being partly removed.
Figure 7:
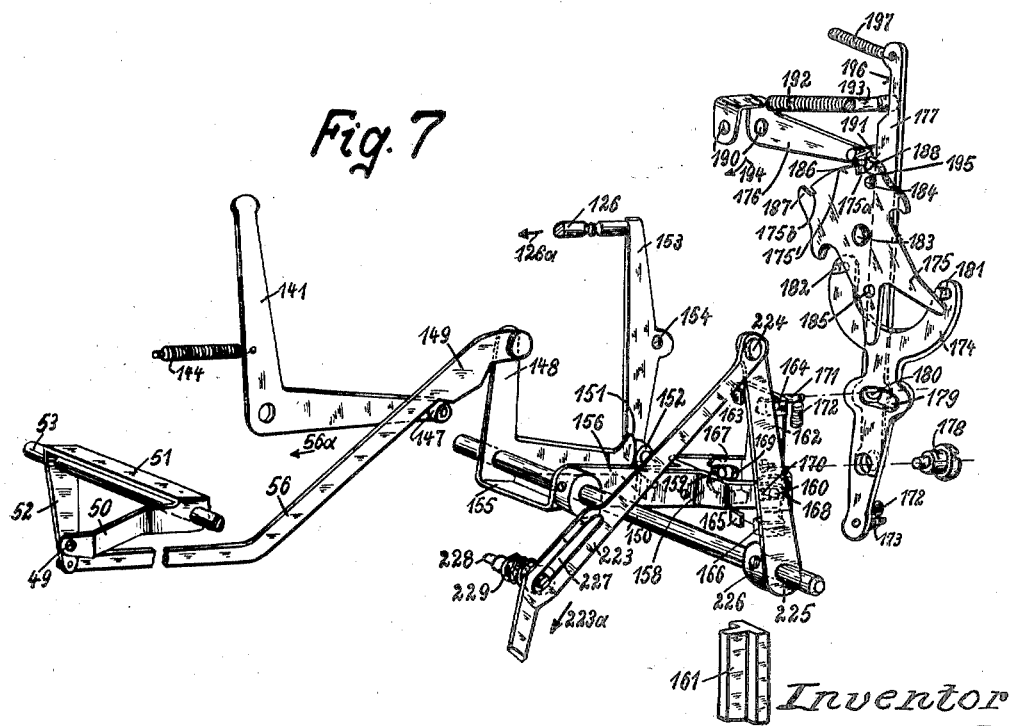
Figure 7 is a perspective view of the mechanism situated to the right-hand side of the typewriter.

The angle lever, 141, Figure 3, which is pivoted by means of a screw, 142, carries on its horizontal arm a roll, 147, which co-operates with the rod, 56, Figures 3 and 7, before mentioned. On the rod, 56, which is in pivotal connection with a lever, 148, there is provided a cam surface, 149, which upon displacement of the rod, 56, towards the left acts on the roll, 147, and causes a clockwise oscillation of the angle lever 141. The lever, 148, is constructed in the form of an angle lever, and is rigidly mounted on the axle, 150. The horizontal arm of the lever, 148, is furnished with a cam surface, 151, see also Figure 5, co-operating with a roll, 152, which is rotatably mounted on the lower arm of a lever, 153. The lever 153, is pivoted to the machine frame by means of a pin, 154, or the like, and its upper arm co-operates on each occasion with a bolt, 126.

The lever, 148, is rigidly connected by a bridge portion, 155, with a lever, 156, Figures 7 and 3. The lever, 156, Figures 4 and 7, is constructed as a fork, a part, 158, being provided thereon. On the sides directed towards each other, the fork portions carry pins, 159 and 160.

On the machine frame, 1, or on the side wall, 117, respectively, there is provided a T-shaped guide member, 161, Figure 7, on which is mounted in a manner to be vertically displaceable, a slide, 162, the lugs, 163, 164, 165 and 166, thereof engaging round the guide member, 161. The slide, 162, is also furnished with two lugs, 167 and 168, which are both bent off angularly and constructed in fork fashion. The lugs, 167 and 168, are furnished with slots, 169 and 170, which are engaged by the pins, 159 and 160, respectively, of the fork-like arm of the angle lever, 148, 155, 156. On the slide, 162, there is also provided a spring pin, 171, which is engaged by one end of a tension spring, 172, the other end of which is attached to the spring pin, 173, of an actuating fork, 174. The actuating fork, 174, the rocker, 175, the locking lever, 176, and the unlocking rod, 177, are shown in Figure 7, for purposes of illustration at some distance from the slide, 162. The actuating fork, 174, in common with the unlocking rod, 177, is by means of a screw, 178, arranged to be oscillatory on the slide, 162, the pin, 171, of the slide passing through a slot, 179, in the actuating fork and a slot, 180, in the unlocking bar, 177. (See Fig. 5.)

Figure 5:
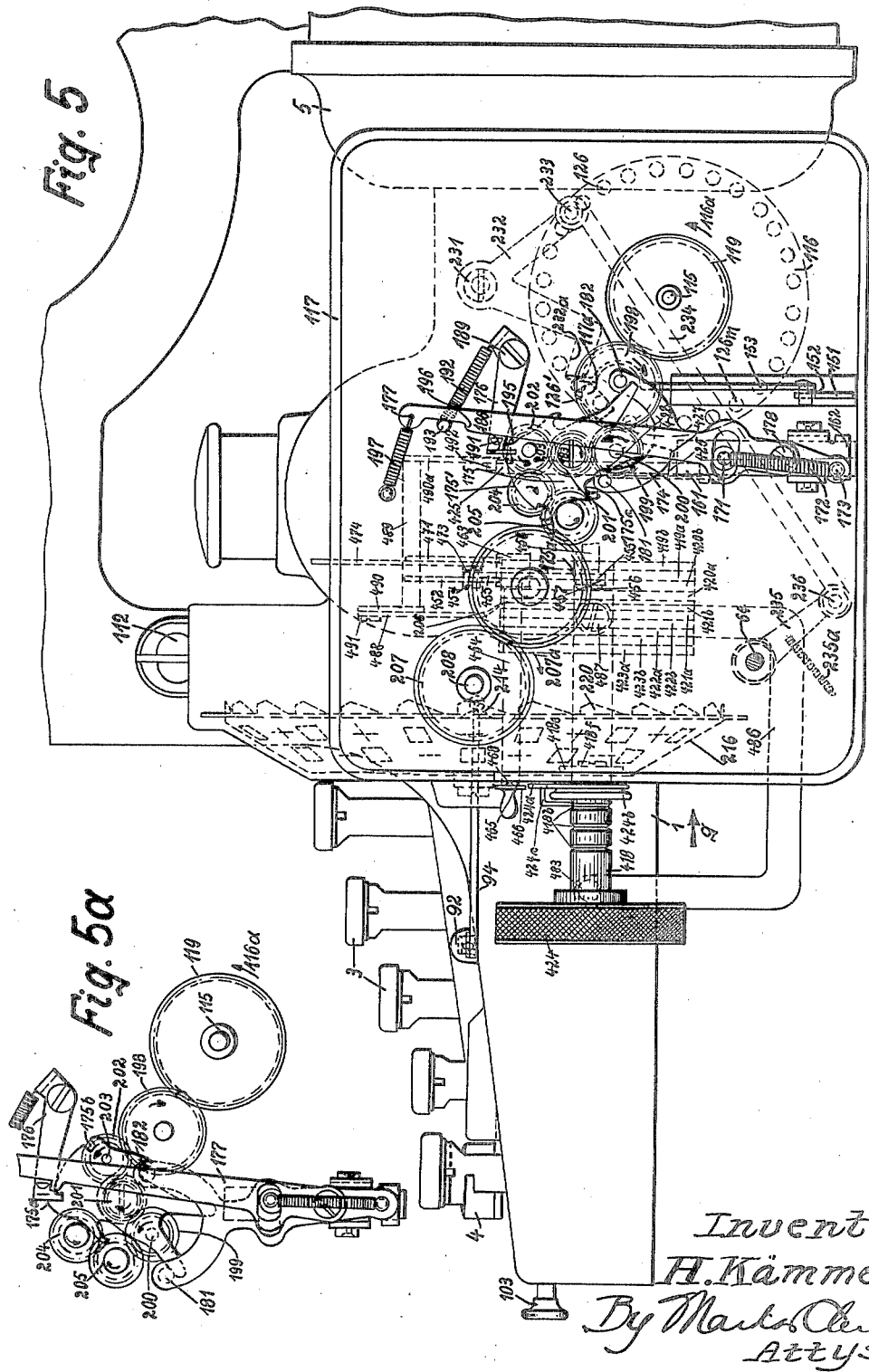
Figure 5 shows a side view of the device according to Figures 3 and 4, with partly removed casing.

The two arms of the actuating fork, 174, are each furnished with a pin, 181 and 182, which are capable of acting on the rocker, 175. The rocker, 175, is pivoted about a pin, 183, or the like on the side wall, 117, and has two holes, 184 and 185, in which are secured bolts which will be more particularly described later and which carry change wheels as illustrated in Figure 5. The rocker, 175, also possesses two slot-like notches, 175a and 175b, which are arranged to be engaged by the lug, 186, of the locking lever, 176. Two stops, 187 and 188, provided on the rocker, 175, are adapted by striking against the lug, 186, of the locking lever, 176, to prevent the rocker from being flung over. The lever, 176, is pivoted to the side wall, 117, by means of a screw, 189, Figure 5, passing through the hole, 190, thereof, Figure 7, and is provided with a pin, 191. By means of the tension spring, 192, one end of which engages with the fixed pin, 193, while the other end is attached to the locking lever, 176, this lever is so acted upon continuously in the direction of the arrow, 194, that it tends to engage with its lug, 186, in the notches, 175a, and 175b, respectively. The unlocking bar, 177, has a projection 195, which co-operates with the pin, 191, of the locking lever, 176, and is furthermore provided with a cam surface, 196, the bar under the action of the tension spring, 197, being maintained in contact with the pin, 193. As already described, a gear wheel, 119, is mounted on the end of the axle, 115, projecting out from the side wall, 117, Figures 4 and 5. The gear wheel, 119, is engaged by a gear wheel, 198, which is rotatably mounted on the side wall, 117, and engages with a gear wheel, 199, which, as shown in Figure 5, is rotatably mounted on the rocker, 175, by means of the bolt, 200, and the hole, 185, Figure 7. The rocker, 175, is mounted on the screw, 183, on the side wall, 117, which screw also carries a gear wheel, 201, likewise engaged by the gear wheel 199. The gear wheel, 201, also engages with a gear wheel, 202, which, by means of a bolt, 203, and the hole, 184, is also rotatably mounted on the rocker, 175. The gear wheel, 202, by means of the gear wheels, 204, 205 and 206, which are rotatably mounted on the side wall, 117, is adapted to be in train with a gear wheel, 207, which is rigidly mounted on an axle, 208.

The axle, 208, is, Figure 4, rotatably mounted near one of its ends in the side wall, 117, and at its other end, in an eye, 209, and carries on its left-hand end a bevel wheel, 210. The bevel wheel, 210, engages with a bevel wheel, 211, which carries on its boss a letter disc or character carrying member, 212, the disc accordingly participating in the rotary movement of the wheel, 211. The bevel wheel, 211, together with the letter disc, 212, is rotatably mounted on the machine frame by means of a screw, 213. Between the bevel wheel, 211, and the boss of the machine frame receiving the screw, 213, there is provided on the screw, 213, a compression spring, 213a, which is secured against rotation in a similar manner to the springs, 120 and 146, above described, and exerts a braking action on the bevel wheel, 211, or the letter disc, 212, respectively. The letter disc, 212, is of frusto-conical form, and carries on its conical portion, as disclosed by Figure 3, and more particularly by Figure 13, two series of letters which, proceeding from zero, or the letter "O" respectively, are applied in the sequence of the orto-telegraphic alphabet. The outer and the inner series of letters are arranged in opposite directions to each other. Displaced anti-clockwise at an angle of 90 degrees from zero, there is provided against the series of letters, 212, a projection, 214, see Figures 4, 5, 6 and 13.

Figure 14:
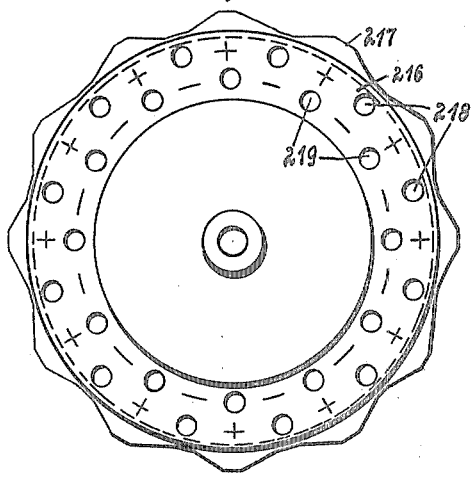
Figure 14 is a view of the reversing disc which alternately releases the series of letters for display.

The screw, 213, also carries a bush, 215, to which there is secured a so-called change-over disc or character displaying member, 216. This change-over disc, 216, is similar to the letter disc, 212, of frusto-conical form. The disc, 216, carries on its periphery, a rim of sinuous form, Figures 3 and 14, the rim having twelve elevations and 12 depressions. The rim, 217, is not required for the arrangement described above, and has been included in the drawings for better comprehension of a later modification. The disc, 216, is furnished on its conical portion with two series each of twelve holes, 218 and 219, which are staggered in relation to each other to the extent of one-half of one division. Between each pair of holes, 218, of the outer series, there is a plus sign and between each pair of holes, 219, of the inner series, a minus sign. These plus and minus signs will be referred to hereinafter and in the claims by the term "prefixes" or "algebraic signs" for the sake of convenience. The change-over disc, 216, is furthermore furnished with twenty-four advancing teeth, 220, Figures 4 and 5. The particular position of the change-over disc is set by the fact that a roll, 221, Figure 4, which is rotatably mounted on a fixed leaf spring, 222, enters into the gaps formed between the teeth, 220. With the advancing teeth, 220, there co-operates a push rod, 223, Figures 3 and 7, which by means of a pin 224, is pivotably connected to a lever, 225, the boss, 226, of the lever being rigidly mounted on the axle, 150. The push rod, 223, according to Figures 3, 4 and 7, is guided by means of a longitudinal slot, 227, and a fixed screw, 228, over which is passed a compression spring, 229, one end of which thrusts against an angle lug, 230, carrying the screw 228, Figure 4, while the other end thrusts against the push rod, 223. In this manner, the push rod, 223, is continuously held against the teeth, 220, of the change-over disc, 216.

On the side wall, 117, there is pivotably mounted on the screw, 231, Figures 4 and 5, an angle lever, 232, the one arm of which is constructed in hook form, with which it projects across the path of movement of the bolts, 126, and the other arm of which, by means of a pin, 233, is in jointed connection with one end of a rod, 234. The other end of the rod, 234, is pivotably connected by means of the pin, 236, with a lever, 235. The lever, 235, is rigidly mounted on the axle 64, described above. The lever, 235, is engaged by a spring, 235a, by means of which this lever mechanism is maintained in a position of rest.

Figure 9:
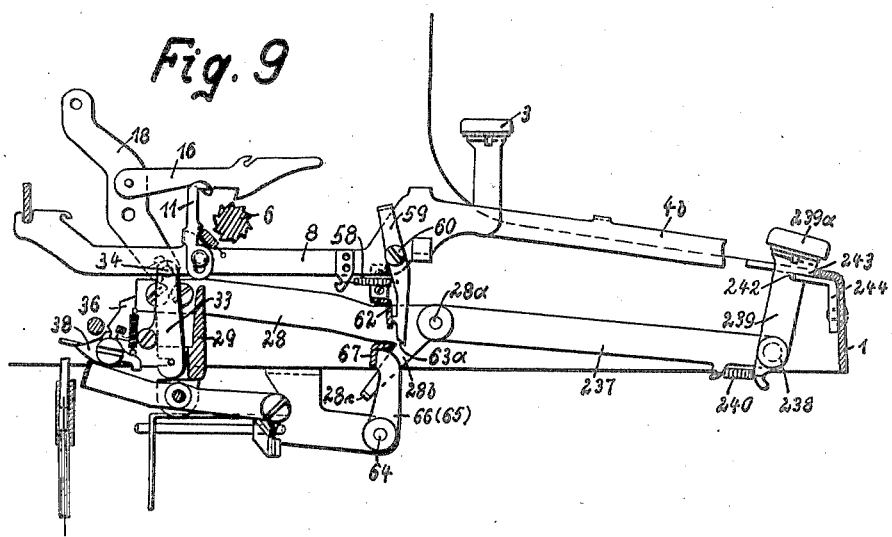
Figure 9 is a part-section through the machine arranged so that the parts are visible which cause the connection and the disconnection of the code-word testing device, the parts being shown in the operative position of the testing device.
Figure 10:
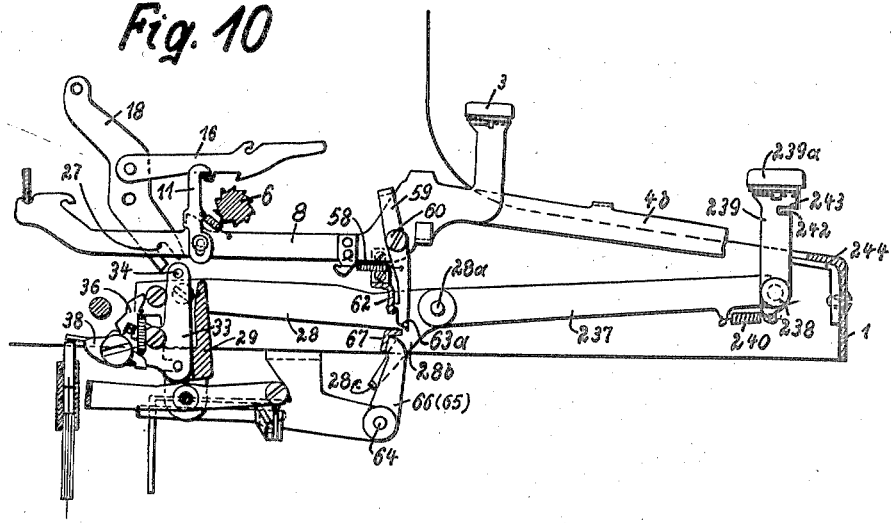
Figure 10 is a view of the mechanism shown in Figure 9, the code-word testing device being, however, in the inoperative position.

The carrier, 29, is, as mentioned above, secured to two levers, 28, of which in Figures 2, 9 and 10, only the right-hand one is shown. Both levers, 28, are firmly mounted in common on the shaft, 28a, by means of suitable bosses, and resemble each other with the exception of the extension, 28b, which is provided only on the right-hand lever, 28, and projects with its nose, 28c, into the plane of the lever, 66. The right-hand lever, 28, as compared with the left-hand lever, 28, is furnished in front of the shaft, 28a, with an extension, 237. On the extension, 237, there is pivoted by means of a pin, 238, Figures 9 and 10, a lever, 239, which is continuously acted upon clockwise by a tension spring, 240. The lever, 239, is furnished with a groove, 242, and also possesses a boss, 243, and a key, 239a. On the machine frame, 1, there is mounted a locking member, 244.

The space key lever, 4b, already mentioned, Figure 8, is mounted in common with the key lever, 4c, on a hollow shaft, 245, which is mounted on the machine frame by means of an axle, 246, simultaneously serving for other purposes. On the lever, 4c, is mounted a pin, 247, projecting into the longitudinal slot, 248, in a lever, 249. The lever, 249, is constructed in exactly the same manner as the writing key levers, 8, and also carries in similar manner an operating pawl, 11, which is also capable of acting on a hook, 16. This hook, 16, is pivotably connected by means of a pin, 250, with a lever, 251, which is pivoted by a pin, 252, to the machine frame and, by means of a pin, 253, is in pivotal connection with a connecting member, 254. The member, 254, in the manner known and accordingly not particularly described, communicates by means of suitable intermediate members with the mechanism causing the advance of the carriage. On the right-hand space key lever, 4b, there is provided a lug, 4x, which co-operates with the rod, 93, already described.

Below the key levers there is arranged a locking device, which prevents that more than one type key, 3, or beyond the space key, 4, a type key, 3, respectively, being operated at the same time.

This locking device consists of rolls, 255, Figures 8 and 8a, which are arranged in a cage, 256, indicated in Figure 8a, by dotted lines. This roller cage is of a length which is as great as the total of the diameters of all the locking rolls, 255, employed plus the width of a locking key, 257, of which there is arranged one on each of the type key levers, 8, and on the space key lever, 249.

A bent member, Fig. 11, comprising arms, 259, 260 and a connecting portion, 261, is mounted to be oscillatory by means of bolts arranged in the machine frame and engaging in the bosses, 258, of the bent member. On the connecting portion, 261, there is provided an extension, 262, to which there is pivoted by means of a screw, 263, a connecting rod, 264. A spring, 265, which has one of its ends connected to the connecting rod, 264, has its other end attached to the extension, 262, so that the connecting rod, 264, is acted upon continuously in an anti-clockwise direction. The connecting rod, 264, is constructed in two parts, and the two parts are connected with one another by means of a longitudinal slot, 265a, and screws, 266, so that they may be adjusted in relation to each other to vary their total length. By means of a screw, 267, the connecting rod, 264, is connected in jointed manner with a lever, 268, which is formed at one end with a slot, 270, through which is passed a screw, 271, mounted in a lever, 272. The lever, 272, is pivoted to the machine frame by a pin, 273, and carries on its upper arm a roller, 274. With the roller, 274, there co-operates an adjustment screw, 275, supported by an angle member, 276, which is mounted on the known universal bar, 277, and in the known manner is moved backwards by the particular type lever, 23, operated, Figure 2, and returned by spring action to its normal position.

Into the slot, 269, of the lever, 268, there projects a lever, 278, which is pivoted to the machine frame and by means of a bush, 279, is in rigid connection with a lever, 280. The lever, 280, is connected in jointed fashion by means of a pin, 281, to one end of a connecting rod, 282, the other end of which is connected by means of a screw, with an angle lever, 284. The angle lever, 284, is pivotably connected by means of a pin, 286, to the machine frame and embraces with the hook-shaped end of the horizontal curved arm, a pin, 287, which is arranged in the hinge-like eyes of a ribbon guide fork, 288, mounted by means of lugs, 289, on the machine frame in a vertically displaceable manner.

The ribbon guide fork carries in the known manner at its upper end the ribbon, 290. The latter is in two colours, the upper half in crossed shading being black and the lower half in oblique shading, red. In Figure 11, the arrangement is so shown that upon actuation of a type lever, the lower, red half of the ribbon is moved into operative position.

In Figure 12, the arrangement of a clear sign key is shown, which co-operates with the space key device. To the right of the space key lever, 4b, there is arranged a key lever, 291, which is of the same form as the ordinary key lever, 8, Figure 6, but it is not furnished with a locking portion, 257, Figure 8a. This lever, 291, is furnished with a lug, 292, which engages over the space key lever, 4b. The key, 291a, of the lever, 291, is provided with a star. The lever, 291, also has an operating pawl, 11, which co-operates with the hook, 16', in exactly the same manner as that described fully above in connection with the writing keys. The hook, 16', assigned to the lever, 291, is pivotably connected by means of a pin, 293, with an intermediate lever, 294, which is oscillatory about a pin, 295, and acts with its pin, 296, on the type lever assigned to it and causes a star to be written. The type lever is not, however, shown in the drawings.

The operation of the device will now be described with the assistance of an example, and the code word to be written will be taken as "Marme", which is composed of the basic word "Marm" and the control letter "E". The word "Marme" is employed for example as an abbreviation for "have bought 700".

At the commencement of the operations the mechanism assumes the position shown in the drawings (with the exception of the position in Figure 10), in which there is situated opposite to the observation aperture S', Figures 1 and 3, a plus and a zero sign or the letter "O". As the initial step, the writing key, 3, corresponding to the letter "M" is depressed, the following takes place:—

The key lever, 8, assigned to the "M" key, Figure 2, is moved downwards about its axis of oscillation, 8a, against the action of the tension spring 8b, whereby the locking lever, 59, slides with its projection, 61, along the fixed bar, 62, and in the lowermost position of the key lever, 8, engages with its projection, 61, under the pull of the spring, 58, below the bar, 62. The key lever 8, is thus held in its oscillated position.

Under depression of the key lever, 8, its locking key, 257, enters into the roller locking means illustrated in Figure 8a, in relation to which it accordingly assumes the position shown on the extreme left in Figure 8a. All other keys are consequently locked against depression, as the rolls, 255, are unable to escape laterally in the cage, 256.

Upon the oscillatory movement of the key lever, 8, the operating pawl, 11, also acts on the projection, 15, of the hook, 16, and oscillates the hook in such a manner against the action of the spring, 19, that the projection, 16a, of the hook enters into engagement with the continuously rotating cam-shaft, 6. In this manner the hook, 16, is moved for such a distance in the direction of the arrow, 25, until it contacts with the fixed rod, 20a, when it is disengaged from the cam-shaft 6. The hook, 16, transmits its motion to the intermediate lever, 18, which accordingly is oscillated clockwise about its axis of oscillation, 21, whereby the lever, 18, acts in the known manner with its pin, 22, on the type lever, 23, and oscillates the latter anti-clockwise about the axle, 26, so that it is caused to strike against the platen and imprint thereon the letter "M", the carriage at the same time advancing one step in the known manner.

During this operation, the intermediate lever, 18, upon its oscillation clockwise acts with its downwardly projecting fork-shaped arm on the pin, 34, of the angle lever 33, and oscillates the lever, 33, anti-clockwise about the pin, 32, in which movement the levers 36 and 38, also participate.

Upon this movement the lever, 38, acts on the bridge, 47, and thus oscillates the U-shaped members, 46—47—46, anti-clockwise about its axis, 45, whereby the forwardly projecting arm of the right-hand member, 46, oscillates, by means of the connecting link, 48, the lever 50, Figure 3, together with the lever, 52, in a clockwise direction. The lever, 52, transmits its motion to the rod, 56, Figures 3 and 7, which is thus moved in the direction of the arrow, 56a. Upon this movement, the rod, 56, acts with its cam surface, 149, on the roller 147, whereby the lever, 141, is oscillated against the action of the spring, 144, so that its upright arm displaces the coupling half, 136, Figures 3 and 4, and moves it out of engagement with the other coupling half, 137, which is formed on the continuously rotating gear wheel, 132. The shaft, 133, together with the pinion, 145, is accordingly stopped, the stoppage being assisted by the braking action of the spring, 146, on the shaft, 133.

By the movement of the rod, 56, in the direction of the arrow, 56a, the angle lever, 148, is also oscillated together with the axle, 150, in the anti-clockwise direction. The lever, 148, thereby acts with its cam surface, 151, Figure 7, over the roll, 152, and oscillates the lever, 153, so that it displaces the bolt, 126', Figures 5 and 7, in the direction of the arrow, 126a, whereby the bolt is protruded so far that it is in the plane of the pinion, 145, regardless whether the latter is in its left hand position of rotation or in its right hand stationary position (such position of the bolt 125' corresponds then to the position of bolt 126 Fig. 4).

Through the medium of the bridge, 155, the lever, 156, also participates in the movement of the lever, 148. In this manner, the lever, 225, is also oscillated, which lever displaces the rod, 223, in the direction of the arrow, 222a, so that the rod advances the operating disc, 216, Figures 3, 4 and 5, and 14 to the extent of one step, whereupon the hole 218a, moves opposite the observation aperture, S', Figure 3, through which there is to be seen a minus sign and also a nought behind the disc, 215, Figures 13 and 14.

As already described above, the horizontal fork-like lever, 156, also participates in the oscillatory movement of the lever, 148, and by means of the pins, 159 and 160, moves the slide, 162, upwards, in which movement, the operating fork, 174, and the unlocking lever, 177, arranged on the slide also take part.

Immediately the slide, 162, together with the operating fork, 174, and the unlocking lever, 177, commence to move upwards, Figures 5 and 7, the projection, 195, acts on the pin, 191, and thus oscillates the lever, 176, so that its lug, 186, moves out of engagement with the notch of the rocker, 175. The pin, 181, of the fork, 174, thereby moves along the edge of the rocker, 175, whereby the fork, 174, performs an oscillation anti-clockwise about the screw, 178, Figure 5. Immediately the lug, 186, of the lever, 176, has moved out of the operative position in relation to the notch, 175b, the fork, 174, has been lifted to such an extent that its pin, 181, enters the recess 175c of the rocker, 175, whereby upon additional lifting of the fork, 174, the rocker, 175, performs an oscillation clockwise about its axis of oscillation, 183, Figure 5.

At the commencement of this oscillation, the unlocking rod, 177, has moved upwards to such extent that its cam surface, 196, runs on the pin, 193, whereby the rod executes about the screw, 178, an oscillation against the action of the spring, 197, whereby its projection, 195, releases the pin, 191, of the locking lever, 176, which thus thrusts with its projection, 186, against the edge, 175', of the rocker, 175. Upon the initial rotation of the rocker, 175, clockwise, the fork, 174, is additionally oscillated anti-clockwise about the screw, 178. Immediately the pin, 173, has been oscillated thereby beyond the dead point, which is situated on the dotted line, Figure 5, passing through 171 and 178 the tension spring, 172, acts on the fork, 174, and imparts to it an additional anti-clockwise rotary movement. The pin, 181, now acts on the rocker, 175, which is thus oscillated to such an extent clockwise that its notch, 175a, is moved into operative position in relation to the lug, 186, which under the pull of the spring, 192, enters into the notch, 175a, and locks the rocker, 175, against additional movement. This latter operation occurs when the slide, 162, has reached its highest position. After the slide, 162, in a manner described later, has again assumed its lower position, the mechanism assumes the position shown in Figure 5a, in which the gear wheel, 199, engages with the gear wheel, 205, and the gear wheel, 202, with the gear wheel, 198. The rocker, 175, accordingly constitutes together with the wheels, 199, 201 and 202, a reversing gear, which is capable of transmitting the motion from the gear wheel, 198, to the gear wheel, 206, in the same or in the opposite direction as desired.

The movements of the mechanism described up to the present have been taken from the U-shaped member, 46, 47, 46, and have the object of stopping the operating pinion, 145, Figure 3, moving the bolt, 126', situated opposite to the lever, 153, with the pinion, 145, in operative position (all remaining bolts, 126, are situated in the operative position), and moving over the reversing gear, 175, 199, 201 and 202. During these operations, after the U-shaped member, 46, 47, 46, Figure 2, has already executed a part of its oscillatory movement, the rearwardly pointing cranked end of the lever, 38, acts on the bolt, 70, and displaces it downwards, whereby the bolt moves the wire, 71, in the sleeve, 68, in the direction of the arrow, 68a, Figures 2, 4 and 6. The wire, 71, now acts on the pin, 122, which it displaces in such a manner against the action of the compression spring fitted over its stem, that the pin moves the bolt, 126, situated in its path of movement towards the right, i. e., out of its operative position in relation to the pinion, 145, in which position it is held by the fact that the spring controlled ball, 129, enters into the groove, 127.

It has already been mentioned above that to each letter key there is assigned a "Bowden" control of this kind, which are arranged in a certain sequence in relation to the drum, 116. Each letter, as shown in the following list of letters and numerals, corresponds to a certain value from 0 to 24, the letters being preferably arranged in the following manner:—

O E R A N I H P S W U K G D F V Z Y X L J
0 1 2 3 4 5 6 7 8 9 10 11 12 13 14 15 16 17 18 19 20
T M C B
21 22 23 24

Since, as mentioned above, the key "M" has been depressed, which key, as disclosed by the above list of letters and numerals, corresponds to the value, 22, the bolt, 126m, Figure 5, will be moved out of its operative position by the "Bowden" control assigned to the key "M".

The displacement of the bolt, 126m, coincides as regards time with the above described operation of the reversing gear, 199, 201, 202. Shortly before the displacement of the bolt, 126m, and the adjustment of the reversing gear has been completed, the lever, 36, Figures 2 and 2a, strikes with its inclined face, 41, against the fixed scrape bar, 42, and by means of it is prevented from additionally participating in the oscillatory movement anti-clockwise on the part of the angle lever, 33, about the pin, 32, while the lever, 38, continues to take part in this movement. In consequence thereof, the lever, 36, performs in opposition to the spring, 39, an oscillation clockwise about the screw, 35. In this manner, the projection, 36c, of the lever, 36, releases the projection, 38c, of the lever, 38, whereby the lever, 38, loses its hold and becomes ineffective on the bolt, 70. By means of the spring which is placed over the stem of the pin, 122, Figure 4, the pin, 122, and accordingly also the wire, 71, as well as the bolt, 70, are returned to the position of rest, whereby, due to the action of the bolt, 70, the lever, 38, performs an oscillatory movement clockwise about the bolt, 37, in opposition to the action of the weak spring, 39. At that moment in which the operation just described takes place, the type lever, 23, returns into its position of rest, and the mechanism just described actuated by the lever, 18, again assumes the normal position shown in the drawings.

Following this actuating and setting operation, the generation of the value is performed with simultaneous transmission to the indicating disc in the following manner:—

It has just been stated that following the stroke of the type lever, 23, the mechanism again resumes the position of rest. This also applies to the rod, 56, Figures 3 and 7. The cam surface, 149, thereby releases the roller, 147, so that the lever, 141, under the pull of the spring, 144, again returns to the position shown in Figure 3, and the slide, 162, into its lower position, whereby the coupling halves, 137 and 138, are again brought together, and the shaft, 133, together with the pinion, 145, takes part in the rotation of the pinion, 132. The pinion, 145, now acts on the bolts, 126, projecting across its path of movement, and thus rotates the disc, 116, in the direction indicated in Figure 5, by the arrow, 116a. This rotation continues only for such a length of time until the tooth gap formed by the bolt, 126m, moved out of its operative position moves into the operative position in relation to the pinion, 145.

The disc, 116, is secured against over-movement by the fact that the displaced bolt, 126m, strikes against a permanent stop, 111a. Shortly prior to the impact of the particular bolt, 126, displaced the bolt moves against the hook-like projection, 232a, Figure 5, of the angle lever, 232, projecting across its path of movement, and oscillates the lever anti-clockwise. This movement is transmitted by the connecting rod, 234, to the lever, 235. By means of the shaft, 64, Figures 1 to 6, this movement is transmitted to the U-shaped member formed by the levers, 65, 66 and the angular bar, 67, which member acts with the bar, 67, against the projection, 63, of the particular locking lever, 59, which is in the operative position, for example, that of the key "M". In this manner, the lever, 59, is oscillated in such a manner that its projection, 61, moves out of the operative position in relation to the locking bar, 62, so that the depressed key "M" now returns into its position of rest. After the action of the bolt, 126, on the lever, 232, the spring, 235a, returns the parts into their normal positions.

Upon this operation of the disc, 116, Figure 5, has, in accordance with the value of the key depressed, been rotated to the extent of twenty-two units in the direction of the arrow, 116a, in which rotation the gear wheel, 119, has also taken part. The wheel, 119, now transmits its motion by means of the wheels, 198, 202, 201, 199, 205 and 206, to the gear wheel, 207, which accordingly rotates in the direction of the arrow, 207a, Figure 5. Through the medium of the shaft, 208, Figure 4, this movement is transmitted to the bevel wheel, 210, which in turn transmits the motion to the bevel wheel, 211, and accordingly to the letter disc, 212. The letter disc, 212, thereupon rotates to the extent of 22 units anti-clockwise (positive direction) Figure 3, so that now, as also illustrated in the diagram according to Figure 15, there is to be seen in the observation aperture, the letter "M", below which there is a minus sign, since as already described above, the actuating disc, 216, has at the commencement of the operation been advanced by one step. The minus sign accordingly indicates the operation for the key to be now depressed.

The key, 3, carrying the letter "A" is now depressed, which key, as described above in connection with the stroke of the key bearing the lettre "M", is locked in its lower position by the locking lever, 59, arranged on the key lever, 8. The type lever corresponding to the key "A" is caused to imprint the letter, so that "MA" is now to be read on the paper. The additional operation is exactly the same as described above in detail as regards the stroke of the key "M". Upon release of the coupling halves, 137 and 138, the bolt, 126m, previously displaced by the "Bowden" control of the "M" key is simultaneously returned into its initial position by the lever, 153, Figures 5 and 7, while at the same time, the reversing gear, 175, 199, 201, 202, is moved by the fork, 174, out of the position illustrated in Figure 5a, back into that shown in Figure 5. At the same time, the disc, 216, is advanced by one step, so that now a plus sign is visible, while a hole, 219, Figure 14, of the inner series uncovers the view of the disc, 212. The plus sign remains in position for such time until a fresh key is depressed so that the disc on each occasion after the depression of a key indicates the calculations for the next key to be depressed.

The value "3" as mentioned above, corresponds to the letter "A". In consequence, the "Bowden" control which is assigned to the "A" key is taken to the third bolt, 126, reckoned from the zero point, which bolt, as explained above in connection with the stroke of the "M" key, due to the stroke of the "A" key, is moved out of its operative position in relation to the pinion, 145. After the engagement of the coupling halves, 137 and 138, the pinion, 145, again moves the disc, 116, in the direction of the arrow, 116a, and the disc is rotated for such time until the gap formed by the displaced bolt, 126, moves into operative position in relation to the pinion, 145. The oscillation of the lever, 232, for the purpose of releasing the key locked in its lower position and also the impact of the displaced pin on the stop, 117a, is the same in the case of each operation and will not be again described. It has already been stated that upon the last operation the disc, 116, is moved to the extent of three units in the direction of the arrow, 116a. This movement is transmitted from the wheel, 119, through the wheels, 198, 199, 201, 202, 204, 205 and 206, to the wheel, 207, which by reason of the reversed reversing gear now rotates in the opposite direction to that of the arrow, 207a, Figure 5. Through the medium of the shaft, 208, and the bevel wheels, 210 and 211, the letter disc, 212, is also rotated to the extent of three units in a negative direction, i. e., clockwise, Figures 3 and 15.

Figure 15:
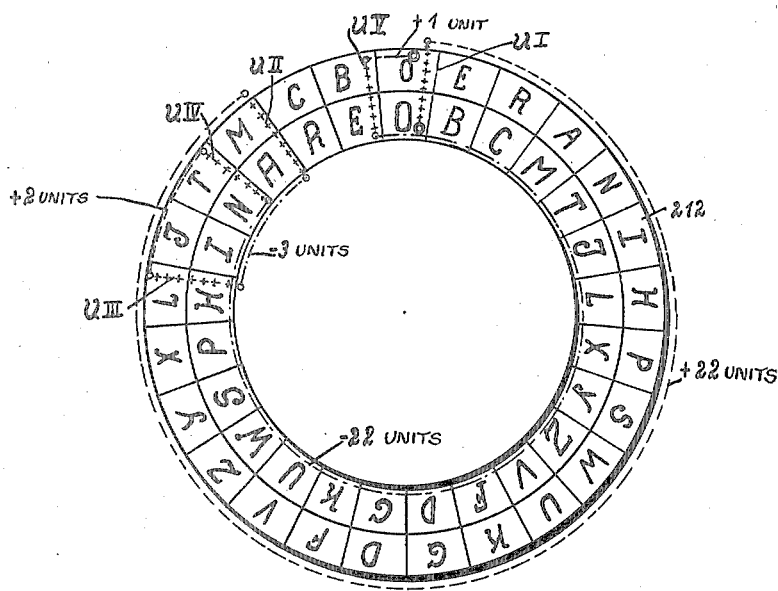
Figure 15 shows diagrammatically the operation of the code-word testing device with the assistance of the code-word testing disc according to Figure 13.

As shown by the diagram in Figure 15, the letter "H" is now visible in the observation aperture, S', Figures 1 and 3.

The key, 3, corresponding to the letter "R" is now depressed, and in the manner described, corresponding with the letter "R", the letter disc, 212, is rotated to the extent of two units in a positive direction, whereupon the letter "T" becomes visible in the observation aperture, S', Figure 3.

"MAR" is now to be read on the paper. Since it is desired to write the word "MARM", the "M" key is again actuated, and the letter disc, 212, accordingly rotated in a negative sense to the extent of twenty-two units. As shown by the diagram in Figure 15, there is now to be seen in the aperture, S', Figures 1 and 3, the letter "E", which is the control letter for the four letters "MARM" and which is now, so to speak, written out by depressing the "E" key. If the "E" key is depressed, the letter "E" will be written, and on the paper there is the word "MARME", while in the aperture, S', a nought or an "O" is visible.

If a nought is situated in the observation aperture, this is an indication that the control letter "E" was correctly copied. If on the other hand, after termination of a word, a nought is not situated on the letter disc, this is proof that the word contains an error.

In the case of codes in which in the so-called code book the control letter is already included, it may be ascertained, by comparing the control letter visible in the aperture, S', with the control letter given in the code book, whether the preceding letters are correct and have been written in sequence.

It is also possible, as disclosed by the above description, to employ the device for forming code words furnished with control letters.

Immediately the letter disc, 212, is situated at zero, the projection, 214, thereon, Figures 4 and 6, meets against the roll, 96, and thus oscillates the angle lever, 94, in such a manner that the lever draws the locking rod connected therewith out of reach of the projection, 4x, on the space key lever, 4b. The space key lever, 4, may now be depressed without difficulty, and the advance movement of the carriage takes place. If on the other hand, the letter disc, 212, is not situated at zero, i. e. if the angle lever, 94, is not oscillated by the projection, 214, the rod, 93, projects into the path of movement of the lug, 4x, provided on the space key lever, 4b. It will be assumed that the writer has not noticed the error, and that for the purpose of advancing the carriage, he depresses the space key, 4. The latter is able to move down to such an extent that the lug, 4x, displaces to a certain extent the rod, 93, and together therewith, the lever, 88, against the action of the spring, 90, about the axis of oscillation, 87, so that it thrusts with its end, 88a, into the roller locking means, 255, 256, and thus causes all keys to be locked. Further depression of the space key to cause the carriage to be advanced, is thereupon prevented by the parts, 93 and 4x. In this oscillated position, the lever, 88, is held by reason of the fact that the lever, 99, under the action of the spring, 100, engages over the projection, 97. At the moment in which the lever 88, enters the roller locking means, the roller, 105, mounted thereon simultaneously presses against the contact spring, 107, so that the two pins, 109 and 110, touch, whereby the above-mentioned circuit is closed and the red signal lamp, 112, is caused to light. Accordingly the writer's attention is drawn to the error made, in the first place, by the locked keys, and in the second place, by the red signal light. For the purpose of correction, the retention may again be released by pressing the button, 103, inwards, whereby the locking lever 99, releases the lever, 88, so that the same returns to its position of rest. The advance movement of the carriage is simultaneously a control for the correctness of the written word, as upon locking of the carriage advance, a special control sign is not written following the controlled word.

In many cases, however, the impression of a control sign is desired. For this purpose a special control key, 291a, is provided, Figure 12, which co-operates with a normal type lever stroke mechanism. If the key, 291a, is depressed, the same acts with its lug, 292, on the space key lever, 4b, so that the same in the manner described above, feels the locking mechanism controlled by the letter disc, 212. If the letter disc, 212, is situated at nought, there is, in addition to the advance movement of the carriage, a "clear" star simultaneously printed, while, if the letter disc is not situated at nought, both are omitted and the machine is locked in the manner described above, and the red signal lamp, 112, is caused to light. Upon actuation of the space key, the "clear" sign key, 291a, remains at rest.

The above remarks all relate to a code word testing device which is situated in operative position in relation to the typewriter. It is also desirable for the code word testing device to be capable of being disconnected in a simple manner so that the typewriter may be used in the normal manner for writing ordinary text. To accomplish this, it is merely necessary to press the key, 239a, Figure 9, to such an extent towards the rear that the fixed locking member, 244, moves out of the operative position in relation to the groove, 242. Under the weight of the support, 29, the levers, 28, oscillate anti-clockwise about the axis of oscillation, 28a, whereupon the parts assume the position shown in Figure 10, in which the pins, 34, of all the angle levers, 33, are out of engagement with the slots, 27b, in the levers 18. The typewriter may thereupon be used in the manner of any normal typewriter. To prevent the locking levers, 59, from moving into operative position in relation to the locking bar, 62, the arm, 28b, of the U-shaped member, 66, 65, 67, is oscillated in such a manner by means of the projection, 28c, that the projections, 63, of the locking levers, 59, move with their inclined faces, 63a, on to the bar, 67, whereby the locking levers, 59, are oscillated to a certain extent against the action of the springs 58, and thus held out of engagement with the locking bar, 62. By simply depressing the key, 239a, the code word testing device may be again coupled with the typewriter.

It is furthermore frequently desired to be able to write normal text, for example, telegraphic addresses, in a different colour to the actual code words, and it is preferred to write the telegraphic address is black and the code words in red.

To avoid special hand-grips for changing over the ribbon, there is provided the device as illustrated in Figure 11, in which the parts are shown in the position which they assume when the code word device is coupled with the typewriter.

On the above described support, 29, which is mounted on the levers, 28, oscillatory about the axle, 28a, there is mounted a pin, 29x, Figure 11, which, when the support, 29, is moved into the operative position, acts in such a manner on the member, 259, 260, 261, that the same also performs an oscillatory movement about its bearing bolts, which are mounted on the machine frame and are disposed in the bosses, 258. The lever, 268, is thereby oscillated through the medium of the rod, 264, in such a manner about the screw, 271, that in relation to the lever, 278, it assumes the position indicated by the full lines in Figure 11. If a key is now depressed, whereby a type lever is caused to oscillate, the lever 272, is, by reason of the same, through the medium of the universal bar, 277, and the adjustment screw, 275, oscillated about the axle, 273, whereby this lever moves the rod, 268, in the direction of the arrow, 268a. The lever, 268, thereby acts on the lever, 278, and oscillates the same. The lever, 278, transmits this motion through the lever, 280, the rod, 282, and the angle lever, 284, to the ribbon guide fork, 288, which by reason of the fact that the lever, 268, engages in the vicinity of the centre of gravity of the lever, 278, performs a greater movement in an upward direction and moves the red half, 290a, of the ribbon, 290, into the printing position.

If, on the other hand, the code device, as shown in Figure 10, is disconnected, the pin, 29x, of the support, 29, Figure 11, releases the member 259, 260, 261, and the lever 268, is moved by means of the rod, 264, into the position in relation to the lever, 278, shown in dotted lines in Figure 11. If a key is now depressed, as described above, the lever, 268 is thus moved in the direction of the arrow, 268a, and a much smaller stroke will be obtained by reason of the fact that the lever, 268, engages at a relatively greater distance from the pivotal point of the lever, 278, with the result that the ribbon fork, 288, is also lifted to a smaller degree. The black portion, 290b, of the ribbon is thus moved into the printing position.

The manipulation of the machine will now be described by the formulation of a possible telegram. It is assumed that an agent wishes to telegraph to his principal's office as follows:—

"have sold 700, Argentine Great West at 93/—".

He at first disengages the code word testing device from the typewriter by unlocking the key, 239a, by oscillation in the manner described above, so that the same moves into its upper position of rest. In this manner the mechanism assumes the position illustrated in Figure 10, whereby at the same time the ribbon mechanism is so actuated, that when depressing a key, the black portion, 290b, of the ribbon is moved into the printing position. An ordinary sheet of paper together with copy sheet is inserted in the machine.

On this sheet he now writes, one under the other and as far as possible to the right:

Have sold 700

Argentine Great West at 93/—.

He now opens his code book and finds for "have sold 700" the code word "MARME" and for "Argentine Great West at 93/—", the code word "ULIHU". These two code words are now written on the left at the side of the two telegram portions, so that the result appears as follows:—

MARME have sold 700

ULIHU Argentine Great West at 93/—.

By means of the key, 239a, he now connects the code word testing device and at the same time thus moves the red portion, 290a, of the ribbon into the printing position. He thereupon writes the two five-letter code words which he has found in red in the free space remaining at the left, one behind the other, i. e., combines the same to the ten-letter code word, so that the result then appears as follows:—

MARME have sold 700
MARMEULIHU
    ULIHU Argentine Great West at 93/—.

After completion of this word, he depresses the control key, 291a, Figure 12, whereupon, in the manner described above, a star is printed behind the ten-letter word and the letter indicating disc, 212, is situated at nought.

The result is then as follows:—

MARME have sold 700
MARMEULIHU*
    (red)
    ULIHU Argentine Great West at 93/—
    (black)

He thereupon removes the paper from the machine, inserts a telegram form, and again disconnects the code word testing device.

Thereupon he writes the telegraphic address and any other remarks in the usual manner, after which he again connects the code word testing device.

He now writes finally the code word
MARMEULIHU
and after completion of the same depresets the space key, 4, but not the testing key, 291a, as the star printed upon depression of the same, should, in order to avoid errors in transmission, not be written. It is in this case not necessary, as after depression of the space key, the carriage only advances if the word has been correctly copied, i. e., if the letter disc is situated at nought. If this is not the case, the red signal lamp, 112, also lights for the purpose of indicating the error.

The telegram thus formulated is handed in for transmission, while the previously formulated control sheet is despatched to the telegram-addressee by the next mail as confirmation. The carbon copy of this control sheet is placed in the files.

The telegram is delivered to the addressee by the postal authorities.

The addressee inserts a control sheet into the machine and writes with the code word testing device connected, the two half code words "MARME" and "ULIHU", one below the other on the left-hand side of the sheet, depressing the "clear" star testing key, 291a, after each word to control the correctness of the words. It may be remarked that the addressee is naturally aware of the fact that five-letter code words are concerned. He thereupon searches in the code book and finds for the word "MARME" the meaning, "have sold 700" and for "ULIHU" the meaning, "Argentine Great West at 93/—." The part sentences thus found he writes, after disconnection of the code word testing device, to the right-hand side of the corresponding code words, and the work, appearing as follows, is completed:—

MARME "have sold 700"
    ULIHU "Argentine Great West at 93/—".

Should it, however, occur that, for example, the word "MARME" is transmitted by the telegraph office in mutilated form as "Merme", the code testing device upon the copying thereof will not be situated at nought, and the machine upon depression of the "clear" star testing key, 291a, will be locked as above described. This retention is thereupon released by depressing the key, 103. The letter indicated by the letter disc is now written, whereupon the code word testing device moves to nought. It would seem quite possible that at the despatch office, two adjacent letters have been interchanged. The procedure is accordingly such that the word is again copied in such a manner that on each occasion two different adjacent letters are interchanged. For example, the first and second letters of the received word are interchanged whilst the last three letters remain unaltered. Following this, the second and third letters are interchanged and so on, until the word has been tested throughout. The result obtained is then as follows:—

MERME MREME MEMRE MEREM

Since a "clear" star is not to be obtained after any of these words, it has been proved that none of these words enter into the question. The error, therefore, can only have resulted from an incorrectly received letter. This control is conducted in the following manner.

The incorrect word "MERME" is again written, omitting, however, the first letter, in lieu of which there is placed the underlining mark. This is naturally performed with the code word testing device connected. After copying off the fourth letter, the writer, moves the carriage to such an extent towards the right that the underlining mark is in the operative position in relation to the copying point, and now writes in the gap left by the underlining mark, the letter visible in the observation aperture, S'. The received word is thereupon again written on this occasion with the omission of the second letter, in lieu of which the underlining mark is again included, and after displacement of the carriage towards the right, the control letter visible in the observation aperture, is filled in. The writer proceeds in the same manner with the third, fourth and fifth letters. The result would now appear as follows:—

IERME MARME MESME MERAE MERMB

The writer then refers to the code book and looks up the meaning of the single words thus formed. In view of the fundamentally different meanings of the words he traces the word very easily, of which the meaning adapts itself to the code word "ULIHU". He merely has to again copy off the words together with their meaning, whereupon his word is completed and the incorrectly received code word has been corrected.

To ascertain an error, it is wholly immaterial whether the same emanated at the sending or the receiving station.

What applies to the above example with a five-letter word in which the first four letters contain the information and the fifth letter represents the control letter, applies in the same manner to words having from one to nine-letter messages, from which, by appending the control letter, two to ten-letter code words are formed (longer words do not enter into the question in practice, as according to the international telegraphic regulations, code words may not contain more than ten letters).

Figure 13:
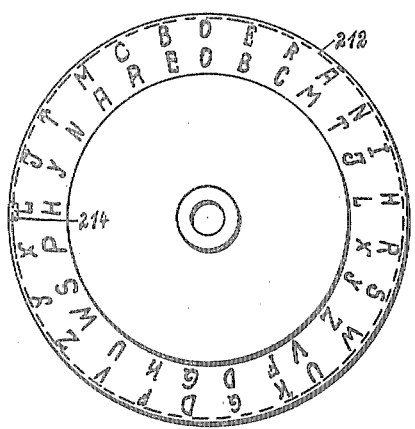
Figure 13 is a view of a code-word testing disc having two series of code letters.
Figure 18A:
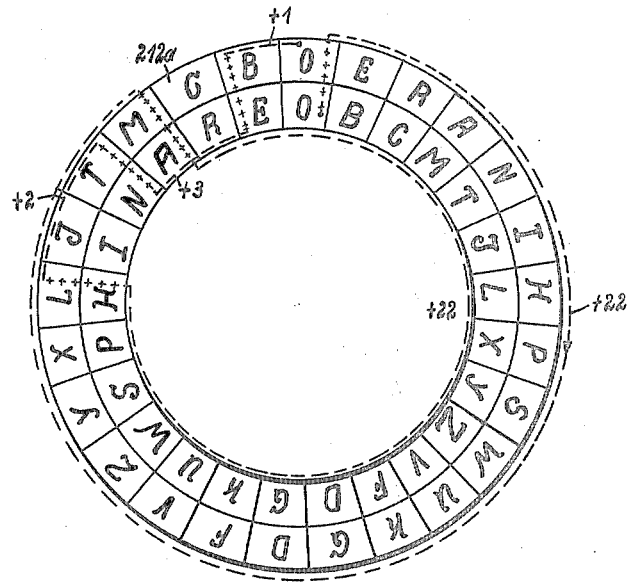
Figure 18a shows diagrammatically the operation of the form of embodiment according to Figures 17 and 18.

In the form of embodiment described above, a letter disc is furnished with two series of letters proceeding from an "O" point in opposite directions and arranged in ortotelegraphic sequence, that is in such sequence as shown in Figures 13, 15, and 18a.

Figure 15A:
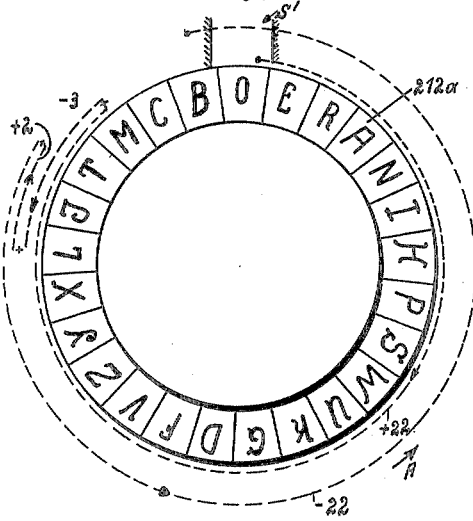
Figures 15a and 15b show diagrammatically series of letters with the assistance of which the mathematical side will be explained in the following description.

It is also possible, however, as shown in Figure 15a, to employ a letter disc having only one series of letters without a reversing disc.

In this case, however, it is not immaterial in which direction commencement is made. If, for example, the letter disc, 212a, in Figure 15a, is rotated at the commencement in the direction of the arrow A, the letter "B" will finally appear in the observation aperture, S', as the control letter for the word "MARM".

The operation accordingly proceeds as follows:—

$$\overset{22}{+M} - \overset{3}{A} + \overset{2}{R} - \overset{22}{M} = -1 = B \qquad (a)$$

Figure 15B:
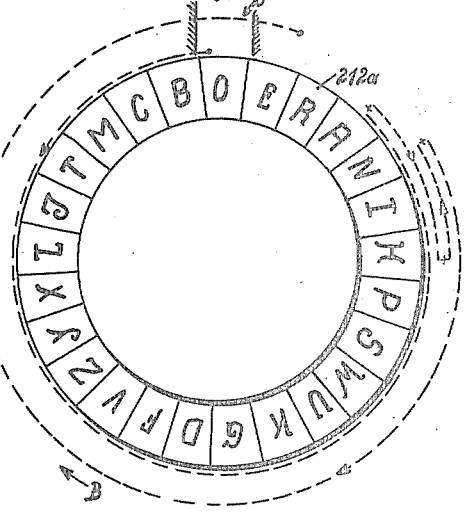

If, however, the letter disc, 212a, Figure 15b, is rotated at the commencement in the direction of the arrow B, the letter "E" will finally appear in the observation aperture, S', as the control letter for the word "MARM". The operation in this connection is as follows:—

$$\overset{22}{-M} + \overset{3}{A} - \overset{2}{R} + \overset{22}{M} = +1 = E \qquad (b)$$

Assuming, therefore, merely one series of letters were provided, the machine would have to be furnished with means for ensuring that the device after completion of a code word would always adjust itself automatically to a direction of rotation of the letter disc which is always constant at the beginning of a code word.

In the case, therefore of ortotelegraphic sequence of the letters in the plus direction, commencement must be made in the minus direction. If the sequence of the letters is in the minus direction, commencement must be made in the plus direction.

Such an arrangement, however, is very complicated in production, and would nevertheless be unreliable.

The control letters, however, may be determined by determining the algebraic total of the differences resulting from two consecutive letter values, whereby commencement naturally always requires to be made with the same prefix, i. e., $$(\overset{22}{-M} + \overset{3}{A})(+ \overset{22}{M} - \overset{2}{R}) - 19 + 20 = +1 = E \qquad (c)$$

In the case of the letter disc described in the form of embodiment according to Figure 15, having two series of letters disposed in different directions, it is immaterial, however, in which direction of rotation commencement is made, as the one series of letters is assigned to the plus direction and the other to the minus direction, and the reversing disc only uncovers the series of lettters corresponding with the particular direction of rotation.

If, for example, commencement is made in the plus direction, the following is obtained:—

$$\begin{array}{lll} \text{Plus row} & \overset{22}{+M} + \overset{2}{R} \\ \text{Minus row} & \overset{3}{-A} & \overset{22}{-M} = -1 = E \end{array}$$

If commencement is made in the minus direction, the following is obtained:—

$$\begin{array}{lll} \text{Plus row} & +\overset{3}{A} + \overset{22}{M} = +1 = E \\ \text{Minus row} & -\overset{22}{M} - \overset{2}{R} \end{array}$$

The reversing key accordingly ensures that on each occasion, only the series of letters is visible which conforms with the prefix.

The form of embodiment according to Figures 16 and 16a, is substantially the same as that in Figures 1 to 15b, with the exception that the transmission from the axle, 115, supporting the value generating disc, 116, to the letter indicating disc, 212, including the intermediately connected reversing gear, is a more simple one. Insofar as the parts employed are the same as in the first form of embodiment described, the same reference characters are used.

In this form of embodiment, the axle, 115, is extended towards the left, and carries on this extension a bevel wheel, 297, which is in permanent engagement with a bevel wheel, 298. The bevel wheel, 298, is mounted on a shaft, 299, which carries on its other end a bevel wheel, 300. The bevel wheel, 300, which normally, i. e., in the plus position of the code device, is in engagement with a bevel wheel, 301, is mounted together with a bevel wheel, 302, on a muff, 303. The muff, 303, is mounted so as to be axially displaceable but non-rotatable on the shaft, 208, and is furnished with an annular groove, 304, which is engaged by the roll, 305, Figure 16a, of a lever, 306. The lever, 306, is mounted so as to be oscillatory on the machine frame, and furthermore carries a roll, 307, which feels the curve, 217, provided on the reversing disc, 216, Figures 3 and 14, and already referred to in connection with the first embodiment. The lever, 306, Figure 16a, is continuously acted upon in such a manner by a tension spring, 308, that the roll, 307, thrusts against the curve, 217.

As already mentioned above, the shaft, 115, and accordingly also the shaft, 299, are upon actuation of the device continuously rotated in the same direction. By the intermittent rotation of the reversing disc, 216, which occurs before the rotation of the letter disc, the elevated and recessed portions of the curve, 217, move alternately into operative position in relation to the roll, 307, whereby the lever, 306, oscillates to and fro. This reciprocatory movement of the lever, 306, is transmitted through the roll, 305, to the muff, 303, whereby the bevel wheels, 302, and 301, engage alternately with the bevel wheel, 300. In this manner, the rotation of the shaft, 208 is varied alternately, and the letter disc, 212, rotates on the one occasion positively and on the other occasion negatively.

Figure 17:
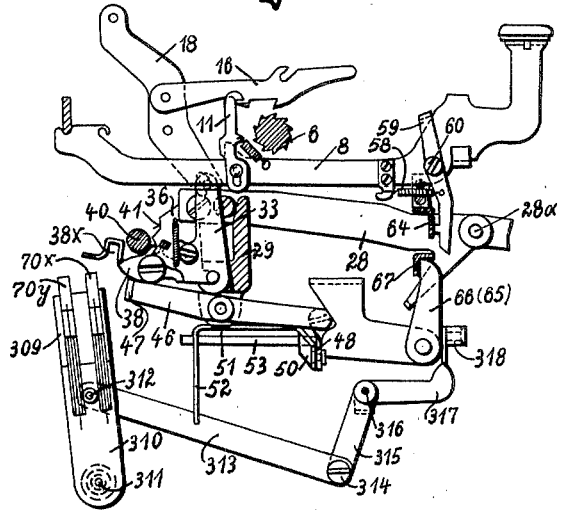
Figures 17 and 18 show an additional modification, Figure 17 being a side view and Figure 18 a perspective view of the device.
Figure 18:
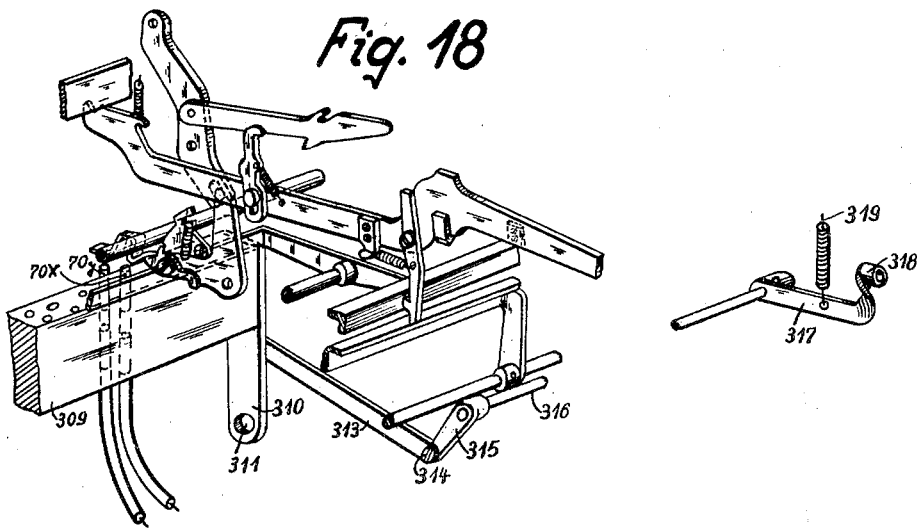

In Figures 17 and 18, a third form of embodiment is shown, in which the reversing gear, by means of which the direction of rotation of the letter indicating disc, 212, is varied alternately, is omitted entirely. In this form of embodiment, the letter disc is not rotated alternately in a positive and negative direction, but continuously in one direction. For this purpose, there are assigned to each type lever mechanism of a letter-writing point two "Bowden" controls, two "Bowden" controls being assigned to each bolt, 126. Figure 5, of the value generating disc, 116. One of these two "Bowden" controls assigned to each point, passes, as above described, to the bolt which is assigned to the particular letter and represents the real value.

For example, one "Bowden" control of the letter "M" passes to the bolt designated, 126m, in Figure 5, and corresponding to the value, 22. The second "Bowden" control, assigned to the letter "B" passes to the bolt, 126, which represents the complementary value of 22, i. e., 3. In the same manner, one "Bowden" control assigned to the letter "A" naturally acts on the bolt, 126, which corresponds to the value 3, while the other acts on the bolt 126m corresponding to the value, 22. If now the two "Bowden" controls of one point are moved alternately into the operative position, the value generating disc, 116, will upon twice depressing the one key, be rotated to the extent of twenty five units. Since in this form of embodiment, no reversing gear is provided between the value generating disc, 116, and the indicating disc, 212, but merely a normal transmission device (not shown), the letter disc, 212, will naturally also be rotated continuously in the one direction. The result is accordingly, exactly the same as if, due to a reversing mechanism, by double depression of the letter key "M", for example, the letter disc, 212, were rotated only to the extent of twenty-two units in a negative direction.

The construction of this embodiment is as follows:—

The lever, 38, which is illustrated in Figures 2, 2a and 6, and is arranged to be oscillatory on the angle lever, 33, is provided with the form shown in Figure 17. The rearwardly extending arm thereof is accordingly cranked in hook fashion. All "Bowden" controls are arranged with one of their ends in a bar, 309, which is secured laterally to two levers, 310, of which one only is shown in the drawings. The levers, 310, are mounted on the machine frame to be oscillatory about the points, 311. On the right-hand lever, 310, there is pivotally mounted, by means of the pin, 312, the rod, 313, which on the other hand is pivoted by means of a screw 314, to a lever, 315.

The lever, 315, is firmly mounted on an axle, 316, which on the other hand carries a lever, 317. On the lever, 317, there is mounted a roll, 318, which under the action of the spring, 319, feels the curve, 217, on the reversing disc, 216, illustrated in Figures 3 and 14.

If now upon depressing a key, the reversing disc, 216, as already described above, is rotated on each occasion to the extent of one unit, an elevation and a recess of the curve, 217, move alternately into operative position in relation to the roller, 318, whereby the lever, 317, executes an oscillatory movement. This oscillatory movement is transmitted via the axle, 316, the lever, 315, and the rod, 313, to the frame formed by the lever, 310, and the bar, 309, whereby the "Bowden" controls move alternately with their pins, 70x and 70y, into operative position in relation to the lever, 38. In the position shown in Figure 17, the pin, 70x, is acted upon when the lever 38, oscillates, while the pin, 70y, is not affected. If, on the other hand, the member, 309, 310, is moved clockwise by the reversing disc, 216, so that the pin, 70y is moved into operative position with regard to the lever, 38, the pin, 70x, will not be affected upon oscillation of the lever following depression of a key, as the same is capable of entering the crank, 38x. The "Bowden" controls corresponding to the complementary values and with the actual values accordingly move into operative position alternately.

Upon writing the code word "MARME" the operation as illustrated in Figure 18, would be as follows:—

If the M-key is depressed, whereby for example, the "Bowden" controls corresponding to the actual values are in the operative position, the value generating disc, 116, and together therewith the letter disc, 212, rotate to the extent of 22 units. For the succeeding "A" it would really be necessary to reckon three units. Since, however, upon the following stroke of the A-key, the "Bowden" controls corresponding to the complementary values are by means of the curve, 217, of the reversing disc moved into the operative position, and the complementary value of minus three is equal to plus twenty-two, the bolt, 126, corresponding to the value, twenty-two, will upon further depression of the A-key be adjusted and this value included in the calculation. The indicating disk, 212, now shows the letter H, Figure 18a. Upon depressing the R-key, the "Bowden" controls for the proper values again move into the operative position, and the value plus two is accordingly included in the calculation, whereupon the letter T will be visible. Since now upon the following stroke of the M-key, the complementary "Bowden" controls again move into the operative position, and the complementary value of minus twenty-two is equal to plus three, the value plus three will accordingly be taken into calculation, and as may be seen from the diagram in Figure 18a, the letter disc shows the control letter "E". If the E-key is depressed, the "Bowden" controls corresponding to the real values again come into the operative position, and the value plus one is taken into calculation, whereby the letter disc, 212, moves to nought.

Figure 19:
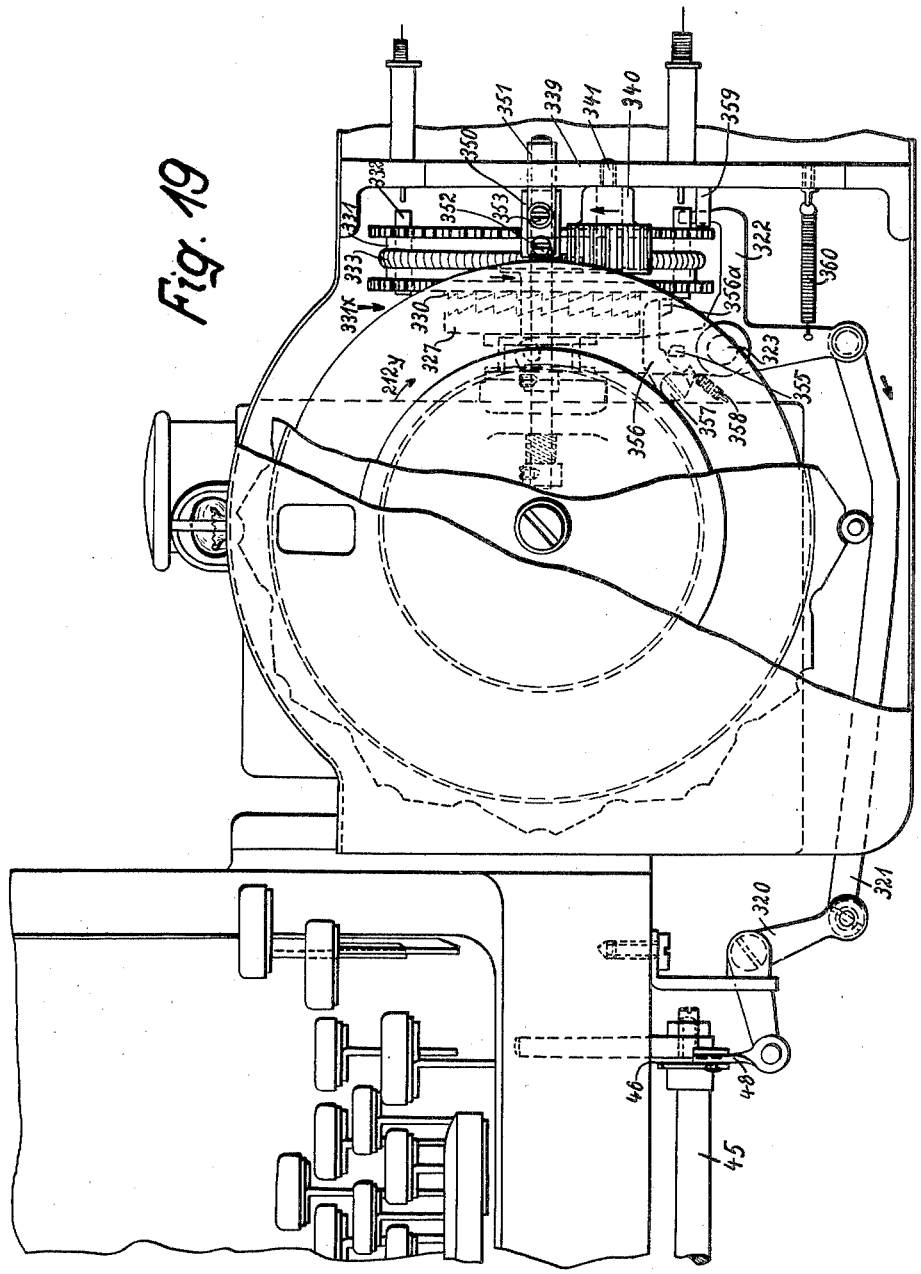
Figures 19 and 20 show a further modification, Figure 19 being a front view and Figure 20, a plan view of the arrangement according to Figure 19.
Figure 20:
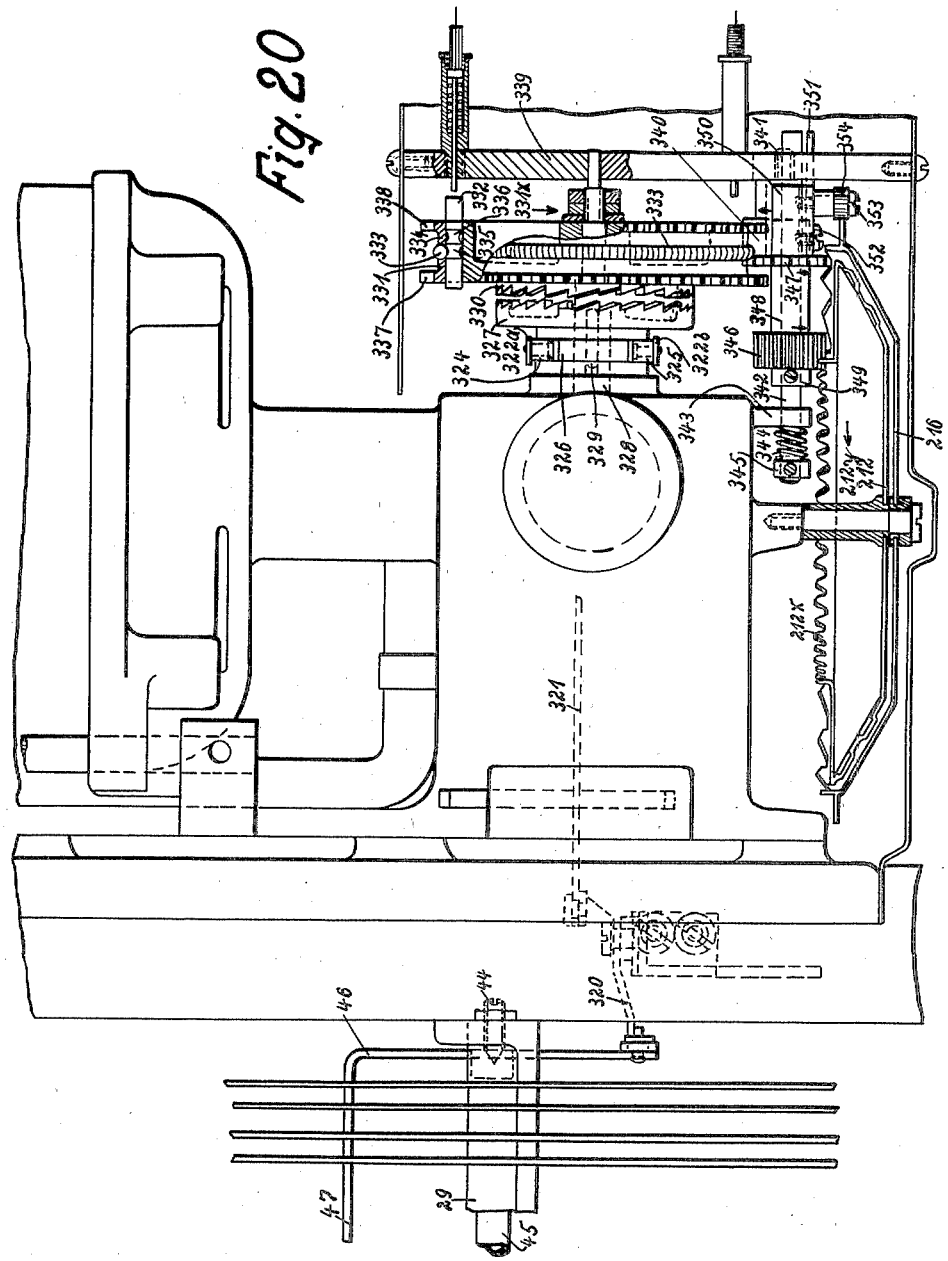
Figure 21:
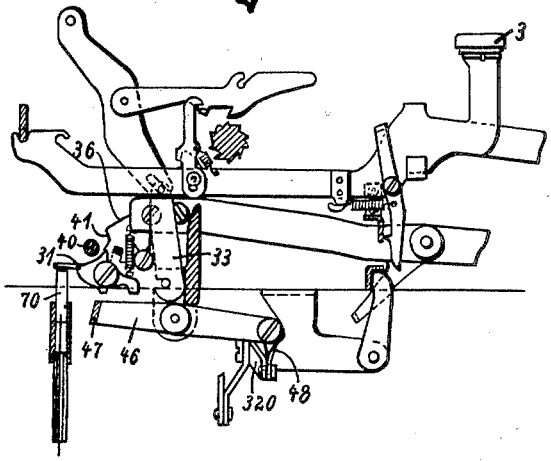
Figure 21 shows a lever arrangement according to Figure 2, adapted to the form of embodiment illustrated in Figures 19 and 20.

In Figures 19 to 21, an additional simplified form of embodiment of the first two embodiments described, is shown. Insofar as the parts are the same as in the previous embodiments, the same reference characters have been selected. The mechanism of the code device arranged below the writing mechanism and co-operating with the same are similar to the mechanism in the first form of embodiment, with the exception that the lever, 38, in the position of rest in the present form of embodiment, contacts with the bolt, 70, of the "Bowden" control, while between the lever, 38, and the rod, 47, of the U-shaped member, 46, 47, 48, a certain play is allowed. Through the medium of the link, 48, and an angle lever, 320, the member, 46, 47, 48, communicates with one end of a rod, 321, which at its other end is in pivotal connection with a lever, 322. The lever, 322, is pivoted to the machine frame, 1, by means of the pin, 323. The upright arm of the lever, 322, is constructed as a fork. The two arms, 322a and 322b, Figure 20, of this fork carry on the sides directed towards each other rolls, 324 and 325, which engage in an annular groove, 326, of a coupling half, 327. The coupling half, 327, is mounted by means of a key, 329, to be non-rotary but axially displaceable on a part, 328, of the continuously rotating cam shaft, 6, Figure 2.

The coupling half, 327, possesses any desired number of coupling teeth, which may be moved into engagement with teeth equal in number and form on the second coupling half, 330. The coupling half, 330, is provided on a disc, 331, which represents the value generating disc and is furnished with twenty five bolts, 332, which, as in the case of the first form of embodiment described, are axially displaceable therein. All the bolts, 332, are, by means of an annular spiral spring, 333, which is set into an annular groove, 334, in the disc, 331, held in common in their particular position occasioned by the engagement of the spring, 333, in one of the two grooves 335 and 336.

The disc, 331, is mounted to be loosely rotatable on the shaft, 328, and is secured against axial displacement. On the periphery of the disc 331, there are provided two toothed rims, 337 and 338. With the exception of the bolt for the particular nought position, there is assigned to each bolt, 332, a "Bowden" control, which "Bowden" controls are all arranged circularly about the centre point of the axle, 328, in the wall, 339. Permanently engaging with the toothed rim, 338, is a gear wheel, 340, Figure 19, which by means of screws, 341, is arranged to be loosely rotatable on the wall, 339. An axle, 342, which is mounted to be axially displaceable, on the one hand, in the wall, 339, and on the other hand, in an abutment, 343, of the machine frame, is acted upon continuously towards the left, with regard to Figure 20, by a compression spring, 344, Figures 19 and 20, which at one end presses against the abutment, 343 of the machine frame and at its other end against a setting ring, 345, on the axle, 342, itself.

The axle, 342, carries, loosely rotatable thereon, gear wheels, 346, and 347, which are connected in common with a muff, 348, and are secured by means of a setting ring, 349, and a bush 350, against axial displacement in relation to the axle, 342.

On the bush, 350, there is secured by means of screws, 352 and 353, a rib, 351, which engages with its portion pointing towards the right in a corresponding recess in the wall, 339, in a manner to be displaceable. The attachment screw, 353, for the rib, 351, carries at the same time a roll, 354, which under the action of the spring, 344, mounted on the axle, 342, feels the curve, 217, provided on the reversing disc, 216. On the letter indicating disc, 212, there is provided a toothed crown portion, 212x, possessing the same number of teeth as the rims, 337 and 338, provided on the periphery of the disc, 331.

On the upright arm of the lever, 322, there is provided a projection, 355, with which co-operates a pawl, 356, the pawl being mounted pivotally, by means of a screw, 357, on the machine frame, and by means of a spring, 358, is acted upon continuously clockwise. The hook-shaped end, 356a, of the pawl, 356, is bent off obliquely towards the rear. The horizontal arm of the lever, 322, is made in hook fashion, and is guided with this hook-shaped end laterally in an abutment, 359, of the wall, 339, which for this purpose possesses a corresponding recess.

By means of the spring, 360, the lever, 322, is acted upon continuously anti-clockwise about its axis of oscillation 323.

The operation of this arrangement is as follows:—

If a key, 3, is depressed, the type lever mechanism is actuated in the manner described above, and the angle lever, 33, thereby caused to oscillate, whereby the lever, 38, through the medium of the "Bowden" control assigned to it, displaces the corresponding value bolt, 332, of the value generating disc, 331, towards the left. Immediately the sloped portion, 41 of the lever, 36, has moved into the operative position in relation to the fixed rod, 40, the lever, 36, in the manner described above releases the lever, 38, and the "Bowden" control returns to its position of rest, while the bolt, 332, displaced by the same, remains in its left-hand position. By the additional movement of the angle lever, 33, the bail, 46, 47, 46, is oscillated, and transmits this oscillatory motion through the rod, 48, the angle lever, 320, and the rod, 321, to the lever, 322, which in consequence executes an oscillatory movement clockwise about its axis of oscillation, 323.

In this manner the coupling half, 327, is displaced in such a manner towards the right that the same moves into engagement with the coupling half, 330, and the hook-like projection provided on the horizontal arm of the lever, 322, moves out of the path of rotation of the bolt, 332.

In this position the lever, 322, is locked by reason of the fact that the locking lever, 356, thrusts against the projection, 355, of the lever, 322, under the action of the spring, 358.

The value generating disc, 331, now participates in the rotation of the coupling portion, 327, for such length of time until the bolt, 332, moved into the operative position meets against the inclined projection, 356a, of the locking lever, 356, which has moved across its path of movement. In this manner, the lever, 356, is oscillated back into its position of rest, whereby it releases the projection, 355, of the lever, 322, so that under the action of the spring, 360, the lever, 322, returns to the position of rest illustrated in Figure 19. In this manner, the coupling is again released and the value generating disc, 331, remains stationary. The disc, 331, is secured against overmovement by reason of the fact that the lever, 322, engages with its projection arranged on the horizontal arm, in the gap formed between the bolts, 332, by the movement of one of the bolts into the operative position. By means of a fixed, inclined surface (not shown) the particular bolt adjusted is at the commencement of a fresh calculation again moved out of its operative position.

The rotation of the value generating disc, 331, is transmitted to the indicating disc, 212, in the following manner:—

If an elevation of the curve, 217, is in operative position in relation to the roll, 354, the axle 342, will be displaced in such a manner that the wheel, 347, moves into engagement with the wheel, 340, which on the other hand engages with the toothed rim, 338, of the disc, 331. The gear wheel 346, engages with the toothed rim 212x, of the indicating disc, 212. Since the disc, 331, is rotated in the direction of the arrow, 331x, the gear wheels will be rotated in the direction indicated by the arrow, so that the disc, 212, is rotated in the direction of the arrow, 212y. If on the other hand, a recess of the curve, 217, moves into operative position with regard to the roll, 354, the axle, 342, will be displaced towards the left and the wheel, 347, moves out of engagement with the wheel, 340, and into engagement with the toothed rim, 337, so that now upon rotation of the disc, 331, in the direction of the arrow, 331x, the rotation of the letter indicating disc occurs in the opposite direction.

Figure 22:
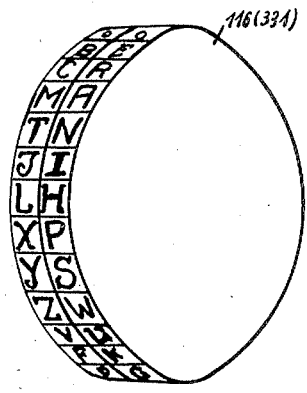
Figures 22 and 23 show in perspective view a modification of the letter and reversing discs.
Figure 23:
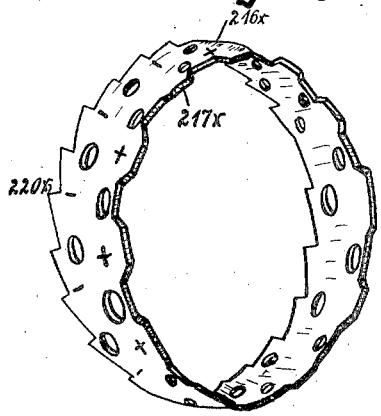

Since now in the case of all forms of embodiment, the value generating disc rotates always in the one direction, the series of letters in the case of these three embodiments, utilizing the form of embodiment according to Figures 17 and 18, may be arranged in direct fashion on the value generating disc, 116, or 331, as illustrated in Figure 22. The reversing disc would then receive the form of a ring, 216x, Figure 23, and above the reversing ring, 216x, there would be provided a corresponding view aperture. For changing over the "Bowden" controls, 70x, 70y, Figure 17, it would naturally also be necessary to provide on the ring, 216x, the zig-zag curve, 217x, and for advancing the ring, 216x the teeth, 220x.

In this manner, the value generating disc, 116, or 331, may itself be employed as letter indicating disc.

It may be additionally remarked that it is not absolutely essential to employ a key-board for selecting the letters; it is also possible to use one single selecting lever moving over a letter sheet, or also a selecting disc such as is usual in the case of telephone apparatus of the automatic type.

The already mentioned gear wheel 119 which is loosely and rotatably secured to the axle 115, is firmly connected with the hollow coupling member 362 (Figures 3, 4 and 27) which is also secured loosely on the axle 115 which is extended towards the right and rests on the one side in the side wall 117 and on the other side in the bearing 361 (Fig. 1).

The gear wheel 119 which rests with its side facing towards the machine against a lug 117a (Figure 4) of the side wall 117, is prevented by an adjustable collar 363 arranged within the hollow portion of the coupling member 362 (Fig. 1) from being displaced in an axial direction. The coupling member 364 which is arranged on the axle 115 so that it can be displaced in an axial direction, but which cannot rotate, is brought into mesh in a way which will be described later, first with the coupling member 362 which is secured to the axle 115 loosely and rotatably, and then with the coupling member 366, which is secured on the axle 115 loosely and rotatably and is connected firmly with the cone-shaped wheel 365, whereby it is obtained that on one occasion the code device only and on the other the cipher device only and finally both devices at the same time can be activated. The cone-shaped wheel 365, and the coupling member 366 which is firmly connected with it are prevented from axial displacement by the adjustable rings 367 and 368 (Fig. 1) of which rings the ring 367 is arranged in the hollow portion of the coupling member 366.

The cone-shaped wheel 365 (Figures 1, 24, 3, 4 and 5) is in mesh with the cone-shaped wheel 372, which is firmly secured to the axle 369, which rests rotatably at 370 and 371 (Figure 1). On the free end of the axle 369 which points upwards a bush 373 is arranged so that it can be displaced axially but cannot rotate. On this bush 373 are firmly secured two cone-shaped wheels 374 and 375 which can be brought into mesh in a way to be described later, alternatively with the cone-shaped wheel 377 which is firmly secured on the axle 376, whereby it is obtained that the wheel 377 and all the parts which are connected with it and which will be described later, are activated once in the positive and the other time in a negative sense.

On the principal driving axle 376, which rests rotatably in bearings 376a and 376b, the principal driving wheel 378 (Figures 1, 29 and 30) is firmly secured in the centre of the machine. At each step of the carriage the principal driving wheel 378 comes into mesh with one of the gear wheels 381 which are loosely and rotatably arranged on axle 380 (Figures 29 and 30) in the letter-rollers housing 379. The interval pieces 381a (Figure 31) which are firmly affixed to the gear wheels 381, prevent a lateral displacement of the gear wheels 381. The axle 380 with its offset parts 382 (in Figure 31 only the right offset part is shown) is arranged in the two side walls 383 and 384 of the letter-rollers housing 379 so that it cannot rotate, and the latter is in mesh, on the one side by its hook-shaped lug 385, and on the other side by its hook-shaped lug 386, respectively over or under the guiding rail 387 which is arranged in the already known way on the front part of the carriage, and is shaped like a dove tail. The letter-rollers housing 379 is pushed laterally on to the guiding rod and is kept in the correct position by suitable means, as, for instance, screws.

Of course the two side walls of the letter-rollers housing can also be shaped without the hook 386, in other words, at this place the side walls are shaped according to the dotted line 386a (Figure 30). On each of the two side walls is then arranged a lever 386c which swings round the point 386b and is provided with a cam 386g, the extension 386d of which, activated by a spring 386e, comes to lie in a socket between the teeth of rack 386f. In this way the letter-rollers housing can easily be removed towards the front and can, if desired, be replaced by an ordinary calculating device of a calculating-typing machine.

In the two side walls 383 and 384 (Figures 29, 30 and 31) of the letter-rollers housing 379 and axle 388 is also arranged, rotatably and so that it can be displaced axially.

On the right outer side of the letter-rollers housing 379 (Figure 31) is secured by means of the screws 389, an eye bearing 390, a part of which is shown in section in Figure 31, and which is provided with a rest 391. On the end 392 of the shaft 388 which protrudes through the eye bearing 390 towards the right, a wing grip 393 is firmly secured, which is provided with a cam 394 which is in mesh with the rest 391 of the eye bearing. Furthermore the eye bearing 390 is provided with a bore 395 (Figure 31) in which rests the pressure spring 396. The latter rests on the one side against the face 397 of the bearing eye 390 and on the other against the face 398 of the axle 388, whereby the latter is constantly activated in the direction "e" of the arrow, so that the cam 394 of the wing grip 393 is held in the rest 391 of the eye bearing 390, whereby its normal length is determined.

Furthermore the pins 399 (Figure 31) are firmly secured on the axle 388, and these act in accord with the firmly arranged pins 400 of the letter-rollers or registering wheels 401, in a manner to be described later. The letter-rollers or registering wheels 401 rotate independently one from the other and are called a plurality of character carrying members or cyphering means. The total number of the registering wheels 401 corresponds with the total number of letters on a fully typed line, and therefore also with the total number of steps of the paper carriage. The registering wheels or letter-rollers 401 have on their circumference the letters of the alphabet in orto-telegraphic sequence. The previously mentioned gear wheels 381 are in mesh with the gear wheels 402 which are rotatably arranged on the axle 388, and which are firmly connected with the letter-rollers 401. In the two side walls 383 and 384, is firmly fixed a ledge 403 (Figure 30). On this ledge are affixed by means of screws 404, plate springs 405, there being one plate spring for each gear wheel 402, and these plate springs prevent the gear wheels 402, the cipher rollers 401 and the gear wheels 381 from being unintentionally wrenched or thrown too far.

On the right inner wall 383 (Figure 31) of the letter-rollers housing 379 a lever 406 is arranged so that it can swing around the axle 388. On the part 407 (Figure 29) of the axle 388 which is extended towards the left and protrudes from the letter-rollers housing 379 the lever 408 (Figures 29 and 30) is arranged so that it can be swung and is provided at its free end which points upwards, with a knob 409. The lever 408 and the lever 406 (Figure 31) are firmly connected by means of the stay 410. On this stay 410, there is above each fifth and sixth letter-place a prong 411 which, provided the lever 408 is in the position shown in Figure 30 in solid lines, does not allow the respective letters to be seen through the spy hole 412. The lever 408 is provided with a bulge 413 (Figure 29) which meshes with corresponding bulges 414 (Figure 30) of the letter-rollers housing 379 whereby the lever 408, the stay 410 and the lever 406 are kept in the position desired at the time. On the axle 415 (Figures 3, 4 and 27) which is suitably arranged in the frame of the machine so that it can rotate freely, there is fixed a wedge 416. This wedge protrudes into a groove 417 of a bush 418 which is arranged on the axle 415. The result of this is that the bush 418 can be displaced axially but cannot rotate on the axle 415. On the bush 418 are firmly secured five pairs of cams, 419, 420, 421, 422 and 423 (Figure 28) which are in the juxtaposition illustrated in Figure 28 (see line a—a), which will be discussed in detail later on. On the free end of the bush 418 which protrudes from the front of the machine casing is fixed a twistable knob 424 (Figures 1, 24, and 27) by means of which the cams 419 to 423 which are firmly secured on the bush 418 can be brought into a position of activity with respect to other parts which will be described later. On the machine casing is an indicator-hand 424a (Figures 1 and 1a) which is arranged so that it can revolve but cannot be displaced and is held by flaps 424b. The indicator-hand is provided with a member 424c and is in mesh with a groove 418a of the bush 418. In this way the indicator-hand 424a is carried along only if the knob 424 is twisted, but not if the latter is displaced axially.

On the wall of the casing are three principal marks 424d between each of which there are two secondary marks. If the indicator-hand comes to point to one of the principal marks, then the pairs of cams 419 to 423 will assume in every instance the so-called starting position which is shown in Figure 28 by a—a.

The pairs of cams therefore have on their circumference three different adjustments which recur three times according to the principal and secondary marks.

Accordingly there is firmly secured on the axle 415 a driving wheel 425 (Figure 27) which has nine cogs and which acts upon the axle 415 and the cams 419 to 423 always in the direction of the arrow shown in Figures 1 and 27. In order to prevent any unintentional wrenching of the just mentioned parts 415 and 419 to 423, a lever 427 is arranged so that it can swing round the point 426, and at its free end is arranged a roller 428, which meshes with the sockets of the cogs of the driving wheel 425, under the pressure of the spring 429 which is suspended from the frame of the machine and is in contact with the lever 427.

The left halves 419a to 423a of the cams 419 to 423 (Figures 3, 4 and 27) act upon the roller 450 (Figures 3, 4, 5 and 27) which is arranged on the lever 452 which can swing round the point 451. By means of the spring 453 which is in contact with the lever 452 and is suspended from the machine casing, the lever 452 and therefore also the roller 450 are activated in such a way that the latter is always kept in contact with one of the cams 419a to 423a.

On the U-shaped free end of the lever 452 which points to the right, the connecting rod 455 is connected by means of the screw 454, and this connecting rod is again connected by means of the screw 456 with the lever 457. The latter is firmly connected with the axle 458 which is suitably arranged in the machine frame in bearings so that it can rotate.

At the free end of the axle 458 is firmly secured a lever 459 at the free and downward pointing end of which there is a bolt 460 which protrudes into a groove 461 of the already mentioned coupling member 364. Whenever the roller 450 comes to lie against any high position of the cams 419a to 423a which may at the time be in a position of activity, the coupling member 364 is adjusted over the parts 452, 455, 458 and 459 in such a way that it meshes only with the coupling member 366 according to Figure 27. It is not always possible to displace forthwith the cams 419 to 423 in an axial direction, because when the cams are in the position shown in Figure 28 a free sliding-over of the roller 450 and the roller 462 which will be mentioned later, is only possible in respect of the cams 421 to 423, but not in respect of the cams 419 and 420. Now, in order to make possible a free displacement of the cams 419 to 423 from the position shown in Figures 3 and 4 a cam 463, 467, is arranged under the lever 452 and the lever 471, which will be mentioned later, which is firmly secured on the axle 464 which rests in bearings in the frame. By means of the crank handle 465 (Figures 1, 3, 4, 5 and 27) which is affixed to the lever 466 which is connected with the axle 464, the cam 463, 467 is acted upon in such a way that by means of its nose 467 it swings out the levers 452 and 471 in a clockwise direction to such an extent that the high parts of the cams 419 to 423 can slide evenly under the rollers 450 and 462. This position of the cam 463, 467 is illustrated in Figure 27. In order that these parts 463, 464, 465 and 466 can be kept in the position adjusted at the time, the lever 466 is provided with a bulge 468, which meshes with corresponding bulges 469 (in Figure 1 only one of these is shown).

The right halves 419b to 423b (Figures 3, 4 and 27) of the curve cam pairs 419 to 423 activate the roller 462 which is arranged on the two-armed lever 471 which can swing round the point 470. The lever 471 is activated in anti-clockwise direction by a spring 472, which on the one side is suspended in the machine frame and on the other side is in contact with the lever 471. At the other end of the two-armed lever 471 is connected by means of the screw 473 the connecting rod 474 which, in its turn, is connected with the lever 475 in a hinge-like fashion. The two-armed lever 475 is arranged so that it can swing round the point 476, and at its other shank 477 it is slightly bent downwards and shaped according to Figure 27. At the free end of this shank 477 (Figures 1 and 24) a bolt 478 is riveted on, which meshes with the groove 479 of the already mentioned bush 373, and couples the cone-shaped wheels 375 and 374 alternatively with the cone-shaped wheel 377. The parts 462, 471, 474 and 475 are held in the respective positions which they occupy at the time, by a spring 472 (Figure 27) the position being determined by the fact that the roller 462 is in contact with one of the cams 419b to 423b, whereby either the cone-shaped wheel 374 or the cone-shaped wheel 375 is in mesh with the cone-shaped wheel 377.

A connecting rod 482 which is flexibly joined to the key lever 480 (Figure 1) of the already known carriage return key 481 defined at 138 in U. S. Patent 1,582,788 is flexibly joined to a lever 484 which is fixed to the axle 483 (Figure 24) which is rotatably arranged in bearings in the typewriter frame. On the right end of the axle 483 (Figure 27) which protudes from the typewriter frame another lever 486 (Figure 27) is firmly secured, to which is flexibly joined by the screw 487 the cross connecting rod 488 which in its turn is flexibly joined by the screw 491 to the lever 490 which is firmly connected with the axle 489 which rests in bearings in the machine frame. At the other end of the axle 489 the lever 490a is firmly connected, and on its free and downward pointing end is secured, by means of screw 490b, to the pawl 492, which is constantly held in mesh with the nine-toothed driving wheel 425.

The method of working of the code-cipher arrangement is described here with the help of the following example:—Let the plain text be: "Geheimabkommen wurde gestern vormittag unterzeichnet".

Let the key-working which is always to be used be:—

"Mercedes Buromaschinenwerke A. G. Zella Mehlis".

The latter can of course be varied ad libitum.

Before explaining the working proper of the device, it will be useful to state first, for the sake of better understanding, the different phases of the work connected with the ciphering and deciphering, as follows. Let it be added that the entire text is to be typed in small letters.

The sender of a letter or a telegram first types the plain text,

"geheimabkommen wurde gestern vormittag unterzeichnet"

and in doing so strikes the space-key for instance after every fifth letter, whereupon the following will appear on the paper "gehei mabko mmenw urdeg ester nvorm ittag unter zeich net".

While in the spy opening 412 of the letter-rollers housing 379 the following text can be seen "geheiomabkoommenwourdegoesteronvormoittagounterozeichonet".

The space key 4 can be pressed down forthwith, because as explained later, during the process of ciphering the code-device is not activated and thus the checkwheel 212 is constantly in zero position, so that the space key 4 is not locked. It is not absolutely necessary to strike the space key 4 after every fifth letter, but it is advisable to do so, because this permits a better disguising of the plain text.

After the plain text has been written, with striking of the space key after every fifth letter, the key text "merce desbü romas chine nwerk eagze llame hlis"

is typed while again the space key 4 is struck after every fifth letter. This key sentence is printed on the paper below the plain text while the following text can be read in the spy-opening 412:

"wrsbhounpuuobmcpyossxidoiymadoixgxcobrbodozcewboyaabloiwj".

This text is now typed out from the spy opening 412 whereby the letter-rollers come into "0" position and the text which has been typed out is imprinted on the paper.

Figure 25:
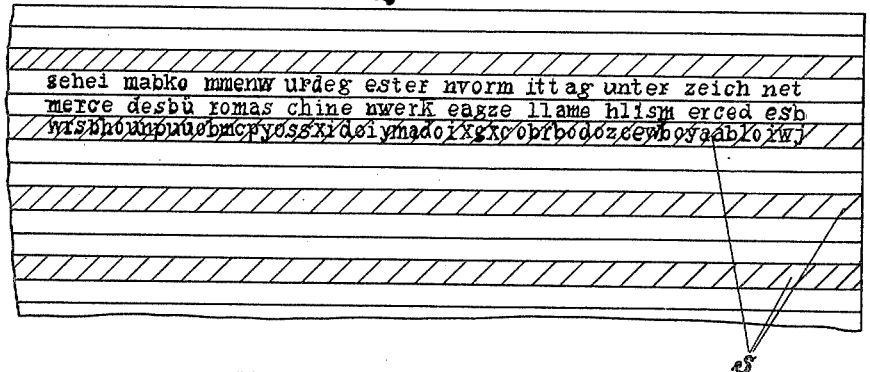
Figure 25 shows a type sheet for the code-cypher device the cross hatched rows showing carbonized areas in the back.

The sheet of paper then shows the text which is illustrated in Figure 25. As, however, the plain and the key text must not be sent to the addressee at the same time, precautions must be taken to the effect that the plain text and the key text are either not imprinted at all, or that they are, in themselves, imprinted but not on the sheet of paper which is sent to the addressee. The second alternative is to be preferred. It is made possible by superimposing two sheets of paper of which the upper is carbon coated on the back at each third reading space S (Figure 25). In this way only the ciphered text is printed through on the lower sheet which is to be sent to the addressee.

The addressee of the message or the telegram writes the text which he has received, namely:

"wrsbhounpuuobmcpyossxidoiymadoixgxcobrbodozcewboyaabloiwj"

on a machine which is identical with that of the sender, after having first set his machine to "deciphering". This type text then appears both on the paper and in the spy-opening 412 of the letter-rollers housing 379. Now the key text—

"merce desbü romas chine nwerk eagze llame hlis"

is typed below this text. This is imprinted on the paper while the letter-rollers or the registering wheels 401 calculate this text subtractively so that the registering wheels 401 show the plain text. The latter is now typed out from the spy-opening 412 of the letter-rollers housing 379, whereby the registering wheels proceed to "0" position and the plain text is imprinted on the paper. In the following the separate operations are described in detail with reference to the machine.

*Ciphering of the plain text*

Figure 26:
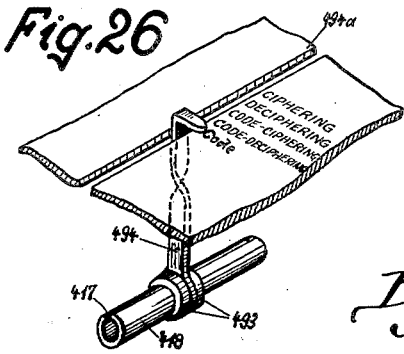
Figure 26 shows a detail in perspective of the indicator for the different possible operations.

As the mechanisms are in the position which is illustrated in Figures 3 and 4 and as this position is used only if the coding device is working, these mechanisms must be set to "ciphering" (Figure 26). For this purpose it is necessary, in the first place, to bring the lever 466 from the position shown in Figures 1 and 4 into the position shown in Figure 27.

When the lever 466 which is firmly secured to the axle 464 is swung from the position shown in Figure 1 to that shown in Figure 27, the cam 463 which is also firmly secured to the axle 464 is also swung in the same way. When this happens the nose 467 of the cam 463 activates the levers 452 and 471 from underneath, so that they are swung out around their revolving points 451 and 470, and, as has been stated previously, this lifts the rollers 450 and 462 sufficiently to allow the displacement of the cams 419 to 423.

The cams 419 to 423 are now shifted by means of the knob 424 (Figure 27) in the direction of the arrow "g" until the indicator 494 (Figure 26) points to the mark "ciphering" which is on the casing.

The series of cams 419 to 423 is held in this position by letting the spring slide 418e (Fig. 4a) fall into the corresponding catch 418b of the bush 418. If now the indicator hand 424a should not yet be pointing to one of the three principal marks 424d then the knob 424 is twisted in the direction shown by the arrow in Figure 1 until this occurs, whereby all the cams take the starting position, shown by a—a in Figure 28, in respect to the rollers 450 and 462, in which position they are held by the latch roller 428 which acts upon the nine-toothed regulating wheel 425. Now the lever 466 is again swung from the position shown in Figure 27 to that shown in Figure 1, whereby the roller 450 is brought into contact with the disc 423a and the roller 462 with the part 423b' of the disc 423b.

In consequence of this the rods 452, 455, 457 and 459 which are guided by the roller 450 cause the coupling box 364 to shift into the position shown in Figure 27, in which it drives only the cone-shaped wheel 365 of the ciphering device, while the driving wheel 119 of the coding device is not activated.

The rods 471, 474 and 475 which are guided by the roller 462, have also shifted the coupling box 373 into the position which brings the cone-shaped wheel 374 in mesh with the cone-shaped wheel 377 whereby the letter-rollers 401 are activated in an additive sense.

After the mechanisms have in this way been set to "ciphering", and the paper carriage is in position on the right, the first line of the plain text is typed. For this purpose first the key 3 (Figure 1) corresponding to the letter "g" (Figure 1) is pressed down. This causes the axle 115 to rotate in the direction of the arrow "h" (Figure 24) by means of the parts which have been described above in detail. The coupling member 364 which is firmly affixed to the axle 115, and which has been brought into mesh with the coupling member 366 in the already described way, therefore causes the latter also to rotate in the direction of the arrow "h" whereby the cone-shaped wheel 365 which is affixed to the coupling member 366, rotates the cone-shaped wheel 372 which is in mesh with 365, in the direction of the arrow "i" Fig. 1. The cone-shaped wheel 374 which is also firmly affixed to the axle 369 and which also rotates in the direction of the arrow "i", causes the cone-shaped wheel 377 with which it is in mesh, to rotate in the direction of the arrow "j" Fig. 1. When this occurs, the principal driving wheel 378 which is firmly connected with the axle 376, is also caused to rotate in the direction of the arrow "j". The intermediate gear wheel 381 (Figures 30 and 31) which is in mesh with the driving wheel 378 and is situated in the letter-rollers housing 379, consequently rotates in the direction of the arrow "k" Fig. 30 and therefore the gear wheel 402 rotates in the direction of the arrow "l", whereby the letter-roller 401 which is firmly connected with it, is also activated in the same direction, and this letter-roller 401, as results from the sequence of letters and numbers, cited in connection with the discussion of the letter disc 212 is rotated by twelve units in the additive sense which corresponds to the key "g" which has been struck.

The processes which have been just described are repeated, until the plain text

"geheimabkommen wurde gestern vormittag unterzeichnet"

has been typed on the paper. But as after every fifth letter the space key 4 has been struck the following has been typed on to the paper.

"gehei mabko mmenw urdeg ester nvorm ittag unter zeich net"

In the spy opening 412 of the letter-rollers housing can now be seen the following:

"geheiomabkoommenwourdegoesteronvormoittag ounterozeichonet"

The letters-rollers 401 therefore have rotated during the typing of the plain text in the additive sense for the values which correspond to the letters.

After the plain text has thus been typed, the key text

"mercedes büromaschinenwerke a. g. zella-mehlis"

has to be typed, i. e. calculated with the text which can be seen in the spy opening.

As after typing the above plain text the paper carriage is on the left, the carriage return key 481 must now be activated.

When this is done the connecting rod 482 (Figures 1 and 24) which is connected with the carriage return lever 480, activates, when pressed down, upon the lever 484 which points backwards and is firmly secured to the axle 483 and swings the axle 483 in the direction of the arrow "m" (Figure 27), whereby the lever 486 which is firmly connected with the latter, is also activated in the direction of the arrow "m". This causes the connecting rod 488 (Figures 1, 3 and 27) to be moved downwards, whereby the lever 490 and the rotatably arranged axle 489 as well as lever 490a are swung against the action of the spring 492a in anticlockwise direction. The pawl 492 which is flexibly joined with the lower end of the lever 490a then activates the driving wheel 425 and rotates it by one cog in clockwise direction.

In consequence of this the parts 415, 416 and 418 as well as the cams 419 to 423 (Figures 3 and 27) are also rotated in clockwise direction by the same space.

As the key text must also be added in the letter-rollers housing 379, the cam 423b is shaped in such a way that the roller 462 (Figures 3, 4 and 27) during the rotation which has just taken place by the action of the driving wheel 425 remains in contact with the raised part 423b' of the cam 423b, so that the mechanisms which are connected with it remain in spite of the rotation of the cams in the position to which they have been set during the typing of the plain text, and therefore the letter-rollers 401 remain set for additive work.

When now the key text

"mercedes büromaschinenwerke a. g. zella-mehlis"

is typed down, the "m" key is struck first, whereby the mechanisms which have been described already, are activated in the same way, so that there is no need to go into details again.

During the typing of the key text the space key 4 is again struck after every fifth letter. On the paper the key text appears in type in the position shown in Figure 25, i. e. below the plain text.

In the spy opening 412 of the letter-rollers housing 379 now the ciphered text "wrsbhounpuuobmcpyossxedoiymadoixgxcobrbodozcewboyaabloiwj" appears. This ciphered text which is to be sent to the addressee is now typed by copying it from the spy opening 412. As, however, the paper carriage is in position on the left, it is first necessary to press down the carriage return key 481, whereby, as has been already explained, the paper carriage is shifted into its right position and the regulating wheel 425 is rotated by one tooth in clockwise direction. As the roller 450 rolls on the concentric disc 423a the parts controlled by it remain unaffected.

Figure 24:
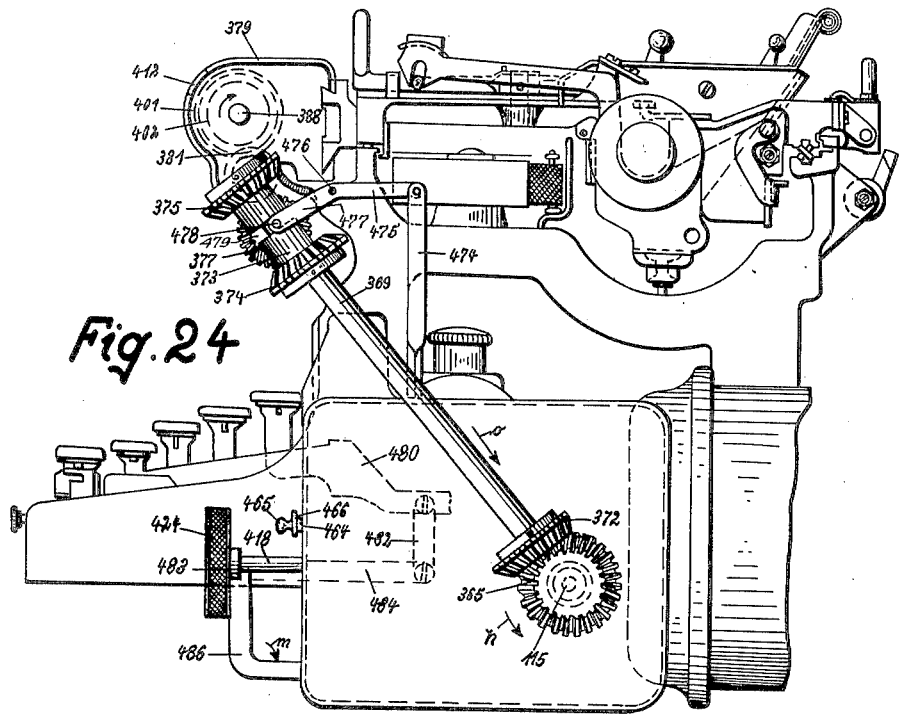
Figure 24 shows a side view of the machine according to Figure 1, viewed in the direction of the arrow "a".

The roller 462, however, has been activated by the spring 472 which is in contact with the lever 471 and has been pushed into the indentation 423b" (Figure 28) of the cam 423b. In consequence of this the lever 471 swings round the point 470 in anti-clockwise direction and thereby shifts the connecting rod 474 in the direction of the arrow "n" (Figure 27). The latter causes the lever 475 to swing in anti-clockwise direction around the point 476 (Figure 24). As the bolt 478 which is on the lever 475 protrudes into the groove 479 of the coupling box 373, it is moved on the axle 369 in the direction of the arrow "o", whereby the cone-shaped wheel 374 is put out of mesh wih the cone-shaped wheel 377, and the cone-shaped wheel 375 is put into mesh with the cone-shaped wheel 377. In consequence of this the letter rollers 401 are now moved in the opposite direction as before, i. e. in the subtractive sense.

The ciphered text must now be copied from the spy opening 412. For this purpose the "*w*" key must be first depressed (see the above ciphered text) whereby, by means of the already described parts, the axle 115 (Figures 24, 3 and 4), the coupling 364 and the cone-shaped wheel 365 are again rotated in the direction of the arrow "*h*". The cone-shaped wheel 372 which is in mesh with the cone-shaped wheel 365 as well as the cone-shaped wheels 374 and 375 which are arranged on the same axle 369 are again activated in the direction of the arrow "*i*". But as, according to what has been stated previously, the cone-shaped wheel 375 is now in mesh with the cone-shaped wheel 377 which is firmly connected with the principal driving axle 376, the wheel 377 and the principal driving wheel 378 which is also firmly connected with the same axle 376, are rotated in a direction opposite to that shown by the arrow "*j*". The intermediate wheel 381, which is in mesh with the principal driving wheel 378 (Figure 30) and is in the letter-rollers housing, therefore also rotates in a direction opposite to that shown by the arrow "*k*", and the gear wheel 402 which is in mesh with it, thus rotates in a direction opposite to that shown by the arrow "*l*". This causes the letter-roller 401 which is firmly connected with the gear wheel 402 to rotate in the same direction, i. e. in the negative sense, whereby it comes into "0" position and the letter "*w*" is typed on the paper. The just described process is repeated until all the letters have been copied from the spy opening 412, whereby the registering wheels or letter-rollers 401 all come into "0" position and the copied letters are typed on to the paper. As the paper, as already stated, is carbon coated only at the back of this line, only the ciphered text will appear on the lower sheet, which is to be sent to the addressee, while on the front page all the lines are typed, according to Figure 25.

If now the carriage return key 481 is again pressed down, the paper carriage is moved into its right position and the regulating wheel 425 is again rotated by one tooth. Hereby the roller 462 (Figures 3, 4, 5 and 27) again comes to rest on the nearest raised part 423*b'* of the cam 423*b*, while the roller 450 remains on the concentric part of the cam 423*a*. In consequence of this the machine is automatically set again for the next plain text line, i. e. for additive working, because the cone-shaped wheel 374 comes again into mesh with the cone-shaped wheel 377, over the parts, 471, 474, 475 and 374.

When the plain text line has been written, the carriage return key 481 is again pressed down, which causes the cams 419 to 423 again to move on by one cog of the regulating wheel 425, and, as has already been described, this does not affect the working of the machine, because the roller 462 remains on the raised part 423*b'* of the cam 423.

Now follows again the typing of the key text line. When this has been done the carriage return key 481 is again pressed down, whereby the action of the regulating wheel 425 causes the cams 423*a*, 423*b* again to move in such a way that the roller 462 comes to lie in an indentation 423*b''* of the cam 423*b*, and causes the machine to work subtractively. This process of working is repeated as long as the indicator 494 is set on "Ciphering".

De-ciphering of the ciphered text

Having described the working of the processes involved in the ciphering, we are now going to deal with the processes involved in the de-ciphering, which are practically the same in an inverse sequence.

Before beginning to de-cipher the ciphered text the machine must be set to "de-ciphering", and this is done in the following manner:

First the levers 452 (Figure 27) and 471 are lifted by the cam 463; then, by means of the knob 424 the cam sets 419 to 423 (Figures 4, 5 and 27 which are in the already described position where the pair of cams 423 is under the rollers 450 and 462, are now set in such a way that the cam part 422*a* comes to lie under the roller 450 and the cam part 422*b* with its raised part 422*b'* under the roller 462, and this is obtained by the operator by setting the indicator 494 (Figure 26) to "deciphering" and then the indicator 424*a* (Figure 1), by twisting the knob 424 to the right, to one of the marks 424*d*, whereupon the cams 463, 467, by bringing the lever 466 into the position shown in Figure 1, set free the levers 452 and 471 and therefore the rollers 450 and 462 come into contact with the cam 422*a* and the raised part 422*b'* of the cam 422*b*. In this position the coupling box 364 is again in mesh with the coupling member 366 and the cone-shaped wheel 374 is again in mesh with the cone-shaped wheel 377, i. e. the ciphering device will work in an additive sense.

Now the operator can begin with the deciphering of the previously obtained ciphered text:

"wrsbhounpuuobmcpyossxidoiymadoixgxcobrbo dozcewboyaabloiwj"

For this purpose this text must be brought into the letter-rollers housing. Therefore the "*w*" key is first depressed, which causes the cone-shaped wheel 377 which is in mesh with the cone-shaped wheel 374, and also the principal driving wheel, to rotate in the direction of the arrow "*j*". In consequence of this the intermediate wheel 381 (Figure 30) will rotate in the direction of the arrow "*k*" and the gear wheel 402 with the letter-roller 401 will rotate in the direction of the arrow "*l*", i. e. in an additive sense. This process is repeated until in the spy opening 412 of the letter-rollers housing 379 the ciphered text will appear and has been typed on the paper.

By means of the carriage return key 481 (Figure 1) the paper carriage is now moved into the right side position whereby the driving wheel 425 and the cam pairs 419 to 423 which are connected with it, are moved on by one cog. Hereby the roller 462 which is affixed to the lever 471, activated by the spring 472 which is in contact with the lever 471, enters into the indentation 422*b''* (Figures 27 and 28) which is in the cam 422*b*, whereby the lever 471 is swung round the point 470 in an anti-clockwise direction and causes by means of the connecting rod 474 the lever 475 to swing round a point 476 also in anti-clockwise direction. In consequence of this the cone-shaped wheels 374 and 375 which are firmly connected with the coupling box 373 (Figures 3, 4 and 27) are shifted in the direction of the arrow "*o*", whereby the cone-shaped wheel 374 is put out of mesh with the cone-shaped wheel 377 and the cone-shaped wheel 375 is put into mesh with the cone-shaped wheel 377, i. e. the ciphering device is again set for subtractive working. As the cam 422a (Figure 28) is concentric, the parts 452, 455, 457, 458, 459 and 364 remain in the position illustrated in Figure 27, i. e. the code device itself remains unaffected.

Now the key text:

"mercedes büromaschinenwerke a.g.zella-mehlis"

which of course must be known to the addressee, must be subtracted from the ciphered text which is in the spy opening 412, whereby care must be taken to press down the space key 4 after every fifth letter.

The letters which correspond to the key text are now struck whereby the cone-shaped wheel 377 which is on the axle 376 and is in mesh with the cone-shaped wheel 375 as well as the principal driving wheel 378 (Figures 29 and 30) are rotated in a direction opposite to that shown by the arrow "*j*". The intermediate wheel 381 which is in mesh with the principal wheel 378 now rotates in a direction opposite to that indicated by the arrow "*k*" and therefore it rotates the gear wheel 402 which is in mesh with the latter and the letter-roller 401 which is firmly connected with it in a direction opposite to that of the arrow "*l*", i. e. the machine is working subtractively. In the spy openings 412 therefore, there appears the plain text:

"geheiomabkoommenwourdegoesteronvormoitta gounterozeichonet"

and the key text:

"merce desbü romas chine nwerk eagze llame hlis"

has been imprinted on the sheet of paper.

The plain text which apears in the spy opening 412 is now copied from the latter.

For this purpose it is first necessary to press down the carriage return key 481 (Figure 1), whereby the paper carriage is moved into the rightside position and the driving wheel 425 as well as the cam pairs 419 to 423 are moved one cog further. As the roller 450 is lying on the concentric part of the cam the parts 452, 455, 457, 458, 459 and 364 are not affected. In the same way the parts which are guided by the roller 462 remain in their original position because the roller 462 is now still in the indentation 422b''.

The letters of the plain text which are visible in the spy opening 412 are now typed out. For this purpose the keys which correspond to these letters are struck whereby after every fifth letter the space key 4 must be struck.

During this process the principal driving wheel 378 is again rotated in a direction opposite to that of the arrow "*j*", the intermediate wheel 381 (Figure 30) in a direction opposite to the arrow "*k*" and the gear wheel 402 as well as the registering wheels 401 in a direction opposite to that of the arrow "*l*" whereby the registering wheels come into the "0" position and the plain text is imprinted on the paper as follows:

"gehei mabko mmenw urdeg ester nvorm ittag unter zeich net"

Code word—ciphering

In order to set the machine ready for code word ciphering the lever 466 must first be moved into the position shown in Figure 27 which activates the cam 463, 467 and lifts the levers 452 and 471.

The knob 424 is now twisted and sets the cam series 419 to 423 so that the indicator 494 (Figure 26) points to "code ciphering" and the indicator 424a is set to one of the principal marks 424d.

In consequence of this the cam 421a comes to lie under the roller 450 and the curve disc 421b under the roller 462. After the lever 466 comes into the position illustrated in Figure 1 the roller 450 comes into contact with the raised part 421a' and the roller 462 with the raised part 421b'. In consequence of this, therefore, the cone-shaped wheel 374 is in mesh with the cone-shaped wheel 377 and the coupling box 364 is again coupled only with the cone-shaped wheel 365 according to Figure 27, so that when the axle 115 rotates the ciphering device 401 is driven through the coupling box 364 in an additive sense.

In the following the process which comes to pass during code ciphering is described in detail. For this purpose we shall take words chosen from a code book, i. e.

"apalj sorfn kaleb merug"

The last letter of these code words is (as is known) always the control letter of the four preceeding letters.

These words are now typed in sequence whereby the control letter is left out. In order to avoid any mistake the lever 408 (Figure 30) is moved from the position shown in dotted lines into the position shown by solid lines whereby the prongs 411 (Figure 31) of the rake 410 which is connected with the lever 408 alternatively cover two letter-rollers and allow four letter-rollers to be seen through the spy opening 412. After every fourth letter, therefore, the space key 4 must be struck twice. The spy opening 412 then shows the following:

"apal sorf kale meru".

The same words have been imprinted on the paper with two spaces between each word.

Before adding the key words which in the present instance we shall assume to be "Antilope" the carriage return key 481 is again pressed down whereby the paper carriage is moved into its right side position and the regulating wheel 425 is moved on by one cog. The rollers 450 and 462 remain during this operation on the raised parts 421a' and 421b' so that no change occurs in the working of the machine.

Now the key word "Antilope" is added as follows to the code words:

"apal sorf kale meru"

"anti lope anti lope"

In other words after each fourth letter of the key words, again two spaces are left free. After the key word has been added the spy opening of the ciphering device will show what follows:

"hkbb rowv fpvh zewk"

On the paper the following is now typed:

"apal sorf kale meru"

"anti lope anti lope"

The ciphered text which is now visible in the spy opening 412, must now be copied from it, and at the same time, the check wheel 212 (Figure 3) must be activated accordingly so that a new control letter is ascertained with reference to the ciphered text. By depressing the carriage return key 481 the paper carriage is again moved into its right side position and the regulating wheel 425 is moved one cog further, whereby the rollers 450 and 462 under the pull of the springs 453 and 472 glide from the raised parts 421a' and 421b' of the cams 421a and 421b into the indentations 421a'' and 421b'' of the latter. This causes the lever 452 to swing in an anti-clockwise direction whereby by means of the connecting rod 455 the lever 457 and the lever 459 which is firmly connected with it by means of the axle 458 are moved in clockwise direction. The indentation 421a'' of the cam 421a is shaped in such a way that the coupling member 364 is in mesh both with the coupling member 362 and the coupling member 366.

Furthermore, the lever 471 is also swung round the point 470 in an anti-clockwise direction whereby by means of the connecting rod 474 the lever 475 is also swung in an anti-clockwise direction so that the cone-shaped wheel 374 is put out of mesh with the cone-shaped wheel 377 and the cone-shaped wheel 375 comes into mesh with the latter. Therefore, the check wheel 212 as well as the ciphering device are activated and the latter in the subtractive sense.

Now the text which can be read in the spy opening 412 is copied, whereby the letter-rollers 401 come into "0" position. As this activates also the check disc 212 the control letter is automatically formed for every four letter word and this must be copied from the check wheel 212 whereupon, exactly as described above, the space key 4 is to be struck every time.

The ciphered code words, together with the control letters, are now imprinted as follows:

"hkbbi rowvn fpvhw zewkg"

As during this operation, as previously explained, the ciphering device works subtractively, the control letters on being copied from the check wheel 212 do not appear on the corresponding number roller but each time the complementary letter to the control letter will appear. The complementary letters are for the above example according to Figure 15 as follows and appear under the prongs 411 (Figure 31) of the rake 410 as follows:

"j t z d"

As the operator cannot see these letters because they are covered by the prongs 411 of the rake 410 he cannot make any mistake.

These letters must now be eliminated by the following already known eliminating device.

By twisting the wing grip 393 (Figure 31) the lift face 394 of the shaft 388 is moved in an opposite direction to the arrow "e" whereby, the pins 399 come into the plane of the pins 400 of the registering wheels 401 so that when the wing grip 393 is twisted further the registering wheels 401 which are already in "0" position and the registering wheels which are outside the "0" position are taken along sooner or later according to their position. When the wing grip 393 has been twisted for one full revolution the latter by means of its catch 394 drops again into the rest 391 whereupon all the letter-rollers 401 again are in "0" position.

*Deciphering of code words*

For the purpose of deciphering the above code words, the levers 452 and 471 are again lifted by means of the cam 463, 467 which can be activated by the lever 466 whereupon by means of the knob 424 the cams 419 to 423 (Figures 4, 5 and 27) are shifted from the code ciphering position in a direction opposite to that of the arrow "g" until the indicator 494 points to "code deciphering". Hereby the cam 420a comes into a position where it acts upon the roller 450 and the curve disc 420b into a position where it acts upon the roller 462. If the indicator 424a (Figure 1) does during this operation not come to point to a principal mark 424b the knob 424 is twisted in the direction of the arrow shown in Figure 1, after bringing the paper carriage by hand into its right side position, whereupon the levers 452 and 471, by moving the lever 466 into the position shown in Figure 1, are again set free from the cam 463, 467. As the cam 420a has an indentation 420a' at this place the roller 450, activated by the spring 453 will enter into it, whereby the two-pronged lever 452 will be swung in an opposite direction round the point 451. By means of the connecting rod 455 the lever 457 and the axle 458 which is in firm connection with the latter as well as the lever 459 are moved in clockwise direction, whereby the coupling member 364 is displaced in a direction opposite to that of the arrow "f", so that now both the coupling member 362 as well as the coupling member 366 are coupled with the coupling member 364. As the roller 462 is lying on the raised part 420b' the parts which are controlled by it come to lie in the position shown in Figure 27, in which the cone-shaped wheel 374 (Figure 3) is in mesh with the cone-shaped wheel 377. Therefore, now the check wheel 212 as well as the ciphering device are activated and the latter in the additive sense.

After the lever 408 has again been swung into the position shown in solid lines in Figure 30, for the same purpose as that which has been described in the chapter "Code Word Ciphering", the addressee now types the ciphered code word text by copying it and strikes the space key 4 after every fifth letter. The spy opening 412 will then show the following:

hkbb rowv fpvh zewk

This has, of course, been also typed on the paper, whereby the control letters are copied from the check wheel 212 and compared with the control letters of the ciphered text so that on the paper the following text appears:

hkbbi rowvn fpvhw zewkg

In order to calculate the key word, it is in the first place necessary to press down the carriage return key 481 whereupon the carriage will move to the right side position in the already known way. Hereby again the driving wheel 425 as well as the cams 419 to 423 are moved one cog further so that the roller 450 slides upon the raised part 420a'' of the cam 420a and the roller 462 comes to lie into the indentation 420b'' of the cam 420b. If the roller 450 lies on the raised part of the cam 420a then the coupling member 364, through the action of the parts 452, 455, 457, 458, 459, has been put out of mesh with the coupling member 362, so that during the subsequent working processes the check wheel is not activated. By the fact that the roller 462 comes to lie in the indentation 420b'' the cone-shaped wheel 374 is put out of mesh with the cone-shaped wheel 377 and the cone-shaped wheel 375 has been put into mesh with the latter, so that now the ciphering device is working subtractively. Now the key word "Antilope" is to be subtracted from the ciphered text which is in the spy opening 412 and for this purpose the letters corresponding to the key word are struck whereby after each fourth letter the space key 4 must be struck twice. On the paper the key text is imprinted while in the spy opening 412 the following appears:

apal sorf kale meru

This text, which indicates the plain text, without its control letters, is now typed on to the paper, whereby after each fourth letter the space key 4 is struck twice.

After the plain text has ben typed on the paper the letter-rollers 401 which are still showing the control letters of the ciphered code words, are brought to "0" position by means of the already mentioned device and the lever 408 (Figure 30) is moved back into the position indicated by dotted lines.

Code word controlling device

If the code word controlling device only, which has already been described, is to work then the levers 452 and 471 are lifted by means of the cam 463, 467 by bringing the lever 466 into the position shown in Figure 27.

By means of the knob 424 the indicator 494 (Figure 26) is now set on the word "Code" whereby the cams 419a and 419b come to lie under the rollers 450 and 462. As these cams are annular, there is no need for the indicator 424a to be put into a special position. By moving the lever 466 into the position shown in Figure 1 the rollers 450 and 462 come into contact with the cams 419a and 419b, whereby the parts controlled by them take up the position shown in Figures 1 and 4.

Although now the cone-shaped wheel 374 is in mesh with the cone-shaped wheel 377 it is yet impossible to activate the ciphering device because the driving connection is interrupted by the fact that the coupling member 366 is out of mesh with the coupling member 364. In this case, therefore, the code word controlling device only, i. e. the check wheel 212 only, is activated.

In the following are now described the parts of the second form of application of the letter-rollers housing. As many of the reference numbers and letters of the parts of the arrangement which have been described above coincide with the parts which are yet to be described it is preferable to choose the identical reference marks.

Figure 32:
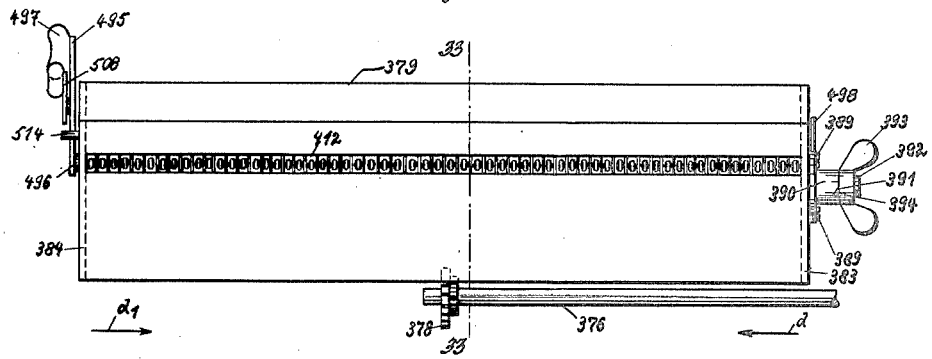
Figure 32 shows a front view of a second example of letter roller housing.

On the left side of the letter-rollers housing 379 (Figures 32 and 34) a lever 495 is arranged so that it can swing around the point 496, and this lever is shaped at its free and upwards pointing end 497 like a handle. On the right side of the letter-rollers housing 379, another lever 498 is arranged so that it can swing around the point 499 but it is smaller in shape than the former. At the free end of the lever 498 and at the point 500 of the lever 495 an axle 501 is firmly connected and protrudes through the slots 502 of the two side walls 383 and 384 of the letter-rollers housing 379 (in Figure 33 however, only the slot 502 which is in the left side wall, is shown). On this axle 501 a toothed gear roller 503 is arranged rotatably. The roller 503 and the levers 498 and 495 are kept in the rest position, shown in Figure 34, by the spring 505 which is in contact with the lever 495 and is suspended from the bolt 504 which is riveted on to the side wall 384; this rest position is determined by the fact that the lever 495 is in contact with the pin 506. On the lever 495 a pawl 508 is arranged so that it can swing around the point 507. The shank 509 which points upwards is shaped like a handle while the other shank 510 is shaped like a pawl. The latter is in contact with a spring 511 which is suspended from the lever 495 and this spring activates the pawl 510 always in such a way that it comes to lie against the pin 512. On the left side wall 384 of the letter-rollers housing is riveted a bolt 514 over which the pawl 508 snaps, whereby the toothed wheel roller 503 is held in mesh with the gear wheels 402 as will be described later on.

Figure 33:
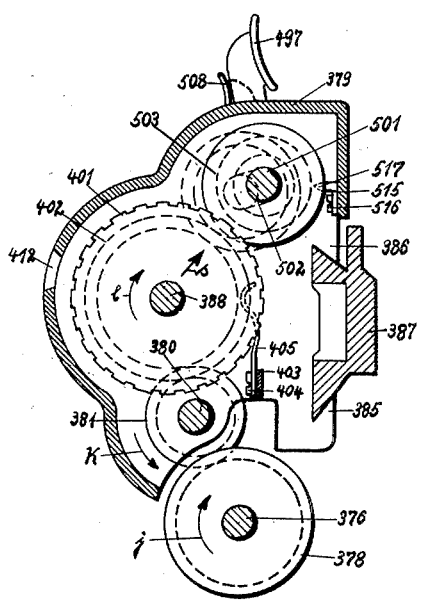
Figure 33 shows a section through the letter roller housing according to Figure 32, the section being on the line 33—33 in the direction of the arrow "d".
Figure 34:
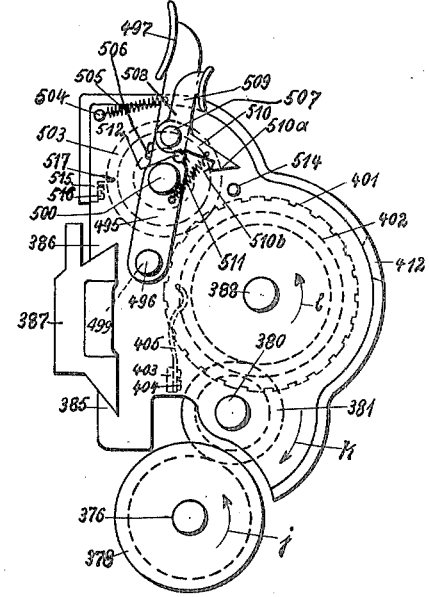
Figure 34 shows a side view of the letter roller housing according to Figure 32, viewed in the direction of the screw "d".

The toothed wheel roller 503 is prevented from unintentionally being rotated by a stop rack 515 (Figures 33 and 34). This rack 515 is fixed to the rear wall of the letter-roller housing by two screws 516 and by means of its part 517 which is in mesh with the sockets of the toothed wheel roller 503 the latter is locked in its rest position shown in Figure 34. The working of this form of application is as follows:—

As in the first form of application the text which has to be ciphered is first brought into the letter-rollers housing 379. But now, differing from the first form of application, no key word is typed under the plain text and calculated with the corresponding plain text letter, but at the end of each line a key letter is calculated by striking the corresponding letter key with the text which is already in the letter-rollers housing after the toothed wheel roller 503 has been put into mesh with the gear wheels 402.

Let us describe the working with the help of the following short example.

Let the plain text be:

"geheimabkommen wurde angenommen"

Let the key letter be: "m".

After the machine has been set to "ciphering" which is done in the already described way the plain text is first typed and after every fifth letter the space key 4 is struck. In the spy opening 412 of the letter-rollers housing 379 the following will be seen:

"geheiomabkwommenwourdeaongenoommeno"

on the paper this text looks as follows:

"gehei mabko mmenw urdea ngeno mmen"

Thereupon the carriage return key 481 is again pressed down whereby the paper carriage is moved into its right side position and the series of cams 419 to 423 is moved one cog further.

Now the key letter "m" is calculated with the corresponding letters of the plain text. For this purpose the toothed wheel roller 503 is moved against the action of the spring 505 by means of the handle 497 and is brought into mesh with the gear wheels 402. The shifting of the roller 503 against the action of the spring 505 causes the pawl 508, which is arranged on the lever 495 so that it can swing, to move in an anti-clockwise direction and against the action of the spring 511 because the face 510a of the pawl 508 is stopped by the bolt 514. This causes finally the nose 510b to lie behind the bolt 514 whereby the toothed wheel roller 503 is held in mesh with the gear wheels 402.

Now the "m" key is struck whereby in the already described way the gear wheel 402 which by means of the intermediate gear wheel 381 is in mesh with the principal driving wheel 378, is rotated by "m" units. But as all the gear wheels 402 are in mesh with the toothed roller 503, all the gear wheels 402 are rotated by means of the toothed wheel roller 503 by "m" units and calculated with the values which are already in the registering wheels 401 whereby the ciphered text becomes visible in the spy opening 412. On the paper under the "g" the letter "m" has been imprinted as follows:

"geiheiomabkoommenwourdeaongenoommeno"
m

According to the above the ciphered text is therefore:

"wcacrmlotsmmllcehmpbucomewemmllce"

In order now to be able to copy this text from the spy opening 412, the paper carrier which has been moved one step to the left when the "m" key was struck, must be moved to the right and this is done in this case by the already known back spacer key R (Figure 1). As this does not affect the regulating wheel 425 the knob 424 is twisted by hand by one degree in the direction of the arrow shown in Figure 1 and this causes the ciphering device to work henceforth subtractively. After the toothed wheel roller 503 has been put out of mesh with the gear wheels 402 by moving the lever 497 into the position shown in Figure 34, the ciphered text is copied, without striking the space key 4, from the spy opening 412 and thereby all the letter-rollers 401 are put into "0" position.

For the purpose of deciphering, the ciphered text is entered in the letter-rollers, after the knob 424 has been put into the required position, and at the same time of course, this text is typed on to the paper. Thereupon, the carriage return key 481 is again struck and the key letter "m" is subtracted from the ciphered text after the toothed wheel roller 503 has been brought into mesh with the gear wheels 402. After the key letter "m" has been struck the plain text becomes visible in the spy opening 412, while on the paper an "m" is typed. After the paper carrier has again been shifted into its correct position by the back spacer key R and the knob 424 has been correspondingly regulated by hand, the plain text is copied from the spy opening 412 whereby after each fifth letter the space key 4 is struck, which causes all the letter-rollers to return again into "0" position.

In the forms of application which have been described the driving movement is derived from the axle 115. It can, however, be just as well derived from the axle 208 but as this axle is acted upon by the described alternating gear by means of which with every step of the carriage the axle 208 is alternately moved first in a positive and secondly in a negative direction it is evident that in this case the rows of letters on the letter rollers 401 will have to be brought up alternately once in the positive and once in the negative direction whereupon the device works exactly in the same way as previously stated and activates all the other mechanisms accordingly.

Figure 35:
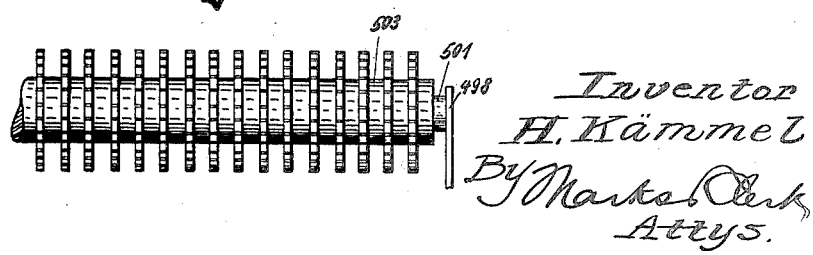
Figure 35 shows a detail of the toothed wheel roller arranged in the second example of letter roller housing shown in Figures 32 to 34.

The toothed roller shown in Figure 35 can also be shaped in such a way that the axle 501 (Figures 36 and 37) is provided on its whole length with a flat side 501a. On this axle is then threaded on, alternatively, a gear wheel 503x and a space collar 503y. The whole is kept together by a nut 503z which is screwed on right and left on the axle. The gear wheels 503x are not shown in this instance as in Figure 35, i. e. with teeth on their whole circumference, but each gear wheel shows a different number of teeth. Thus, for instance, it is preferable to have the gear wheel 503x which is on the extreme left with teeth round its whole circumference. On the wheel situated next to it on the right one tooth may be left out, on the next wheel to the right three teeth, on the next wheel two teeth, on the fifth gear wheel all the teeth but one, etc. The sequence in the number of teeth can therefore be chosen ad libitum. As now, when the key text is added to the plain text, the paper carriage is in its extreme right side position, the gear wheel 503x which is on the extreme left is in mesh with the principal driving wheel 378 by means of the gears 402 and 381. Therefore, it is only necessary to strike the particular letter key the value of which corresponds to the number of teeth of the complete gear wheel 503x so that then the toothed roller makes a whole revolution whereby into each place according to the different number of teeth on the gear wheels 503x different values are added.

It is evident that the addressee must have for the purpose of deciphering a toothed roller on which the sequence of gear wheels 503x on the axle 501 corresponds exactly to that on the sender's machine. From time to time the sender can arrange with the addressee the arrangement of a different sequence.

This arrangement makes it possible to add in each place a different key value and to change the master key from time to time.

I claim:

1. In combination, a plurality of keys, printing mechanism controlled by said keys, means for carrying control characters, means for carrying algebraic signs having apertures thereon for disclosing control characters, means acting on the operation of said keys for moving said character carrying member and said sign carrying member together with means coacting with said sign carrying member for controlling the direction of said character carrying member.

2. In combination, a plurality of keys, printing mechanism controlled by said keys, a rotatable disc for carrying control letters, a rotatable disc for algebraic signs, a casing enclosing said discs and provided with a view aperture together with means coacting with said keys for actuating said rotatable discs.

3. In combination, a plurality of keys, printing means controlled by said keys, a rotatable disc carrying control letters, a rotatable disc carrying algebraic signs, said latter disc having staggered rows of holes, together with means coacting with said keys for rotating said discs.

4. In combination, a plurality of keys, printing means controlled by said keys, a rotatable disc carrying control letters, a rotatable disc having staggered rows of holes and appertaining prefixes, a casing for said discs having a view aperture, said aperture uncovering one hole of said second rotatable disc with the appertaining prefix, together with means coacting with said keys for rotating said discs.

5. In combination, a plurality of keys, printing means controlled by said keys, a member carrying control characters, a rotatable disc having displaceable pins, means coacting with said rotatable disc for actuating said character carrying member, a pinion adapted to engage with said pins on said disc, a power drive for said pinion, means coacting with said keys for disengaging said pinion from said drive during displacement of said pins and for engaging said pinion after adjustment.

6. In combination, a plurality of keys, printing mechanism controlled by said keys, a control character disc actuated from said keys, an idle key, a key lock for said keys, an operating means between said key lock and said idle key, said operating means being held in cooperative relation to said idle key by said control character disc in all of its positions with the exception of its zero position.

7. In combination, a plurality of keys, printing mechanism controlled by said keys, an idle key, a control character disc actuated by said keys, together with a light signal which is operative on operation of said idle key when the control character disc is not in its zero position.

8. In combination, a printing mechanism comprising a type bar, a key and an intermediary member, power operated actuating means for said intermediary member, a control character determining device, a value generator, setting means for said value generator, a reversing gear between said value generator and said control character determining device, a universal operating member for said setting means and said reversing gear, said universal member being in operative connection with said intermediary member.

9. In combination, a typewriter having writing keys, an idle key and carriage advancing mechanism, a control character determining device combined with said typewriter, means coacting with said idle key for locking said writing keys, said means preventing advance of said carriage and displaying a light signal.

10. In combination, a typewriter having writing keys, an idle key and carriage advancing mechanism, a control character determining device combined with said typewriter, means co-acting with said idle key for locking said writing keys, said means preventing advance of said carriage and displaying a light signal together with means for releasing said locking means.

11. In combination, a typewriter having an idle key, a control character determining device combined with said typewriter, together with a "clear" sign key coacting members on said keys controlling said idle key.

12. In combination, a type bar operating mechanism, means for determining control characters, together with a key for operatively connecting said mechanism and control character means at will.

13. In combination, a typewriter, means for determining control characters, a key for operatively connecting said typewriter and said control character means at will, together with means for co-operating with said key for shifting the ribbon of said typewriter.

14. In combination, a plurality of keys, printing means controlled by said keys, a disc carrying control characters, a disc carrying algebraic signs, a value generator operating said character disc on depression of a key, reversing means interposed between said value generator and said character carrying disc, together with means coacting with said sign carrying disc for operating the reversing means.

15. In combination, a plurality of keys, printing mechanism controlled by said keys, a control character carrying device, a value generator actuating said character carrying device and controlled by said keys, displaceable pins on said generator, a pair of setting means for said pins associated with power operated means controlled by each key, said setting means being shiftable in common for selectively bringing one or the other, of said setting means into cooperative relation to said power operated means.

16. In combination, a plurality of keys, printing mechanism controlled by said keys, means controlled by said keys for determining control characters, a value generator actuating said character carrying device, displaceable pins on said value generator for defining its movements together with means coacting with said keys for selecting said pins in accordance with real or complementary values of said keys.

17. In combination, a plurality of keys, printing mechanism controlled by said keys, a coupling, control character determining means including a value generator, said generator being provided with ratchet teeth constituting one half of said coupling and two toothed rims constituting one part of a reversing gear for said control character determining means.

18. In combination, a plurality of keys, printing mechanism controlled by said keys, control character determining means, a coupling and a locking member, said coupling member on the depression of a key being locked in its coupling position by said locking member, and released on completion of value transmission.

19. In combination, a plurality of keys, printing mechanism controlled by said keys, means for carrying a series of control characters, an indicator for said control characters, together with means acting on the operation of said keys for effecting movement of said indicator and said character carrying member, the movement of said last named member corresponding in amount to predetermined values.

20. In combination, a plurality of keys, printing mechanism controlled by said keys, means for carrying a series of control characters, an indicator for said character carrying member, together with means acting on the operation of said keys for effecting movement of said indicator and said character carrying member, said last named member moving alternately in opposite directions.

21. In combination, a plurality of keys, printing means controlled by said keys, a member for carrying control characters, a second member for displaying a single character of said control character carrying member, and means for operating both of said members on depression of a key, said operating means including reversing mechanism.

22. In combination, a plurality of keys, printing mechanism controlled by said keys, means controlled by said keys for determining control characters, together with means for operating said determining means in accordance with the real and the complementary value of said keys alternately.

23. In combination, a plurality of keys, printing mechanism controlled by said keys, control character determining means comprising a single character carrying member, ciphering means comprising a plurality of character carrying members, a value generator common to said plurality of character carrying members and said single character carrying member, and coupling means for selectively coupling said value generator with said plurality of character carrying members or said single character carrying member or for coupling said generator simultaneously with said single character carrying member and said plurality of character members.

24. In combination, a plurality of keys, printing mechanism, a driving member for operating said printing mechanism upon depression of said keys, control character determining means comprising a single character carrying member, ciphering means, comprising a plurality of character carrying members, a value generator in driving connection with said driving member, a driving connection between said value generator and said single character carrying member, a second driving connection between said value generator and said plurality of character carrying members, and coupling means for selectively coupling said value generator with one or the other or with both of said driving connections.

25. In combination, a typewriter having a plurality of keys, printing mechanism, a value generator, a driving member for said printing mechanism and said value generator, control character determining means comprising a single character carrying member, ciphering means comprising a plurality of character carrying members, a driving connection between said value generator and said single character carrying member, a second driving connection between said value generator and said plurality of character carrying members, coupling means for selectively coupling said value generator with one or the other or with both of said driving connections, said second driving connection including a reversing gear, a plurality of cam pairs, a control lever for said coupling means, a control lever for said reversing gear, one cam of each pair operating said coupling control lever while the other cam of each pair operates said reversing gear control lever.

26. In combination, a typewriter having a plurality of keys, printing mechanism, a value generator, a driving member for said printing mechanism and said value generator, control character determining means, comprising a single character carrying member, ciphering means, comprising a plurality of character carrying members, a driving connection between said value generator and said single character carrying member, a second driving connection between said value generator and said plurality of character carrying members, coupling means for selectively coupling said value generator with one or the other or with both of said driving connections, said second driving connection including a reversing gear, a plurality of cams, mounted in fixed relation on a tube slidably arranged on a rotatably mounted shaft, connecting means between said cams and said coupling means and reversing gear, a ratchet wheel on said shaft for stepwise rotation of said cams, indicating means and a thumb wheel on said tube for adjusting said cams both slidably and rotatably at the will of the operator.

27. A device according to claim 26, having in combination a manipulative member, a pawl for operating said ratchet wheel, connecting means between said member and said pawl, said pawl upon operation being adapted to rotate said cams to a certain distance.

28. In combination, a typewriter, a carriage, a platen on said carriage, printing mechanism to print on said platen, a plurality of character carrying members on said carriage, a master wheel for operating a certain one of said character carrying members, a value generator for said master wheel, a power driven shaft for said printing mechanism and said value generator, and a toothed wheel roller adapted to selectively intermesh with all of said character carrying members to cause the same to rotate to the same extent as a character carrying member intermeshing with said master wheel.

29. In combination, a typewriter, a carriage, a platen on said carriage, printing mechanism to print on said platen, a plurality of character carrying members on said carriage, a master wheel for operating said character carrying members, a value generator for said master wheel, a power driven shaft for said printing mechanism and said value generator, and a member having a plurality of mutilated gears adapted to rotate said character carrying members various distances upon a single revolution of said member.

30. In combination, a plurality of keys, a paper carriage, printing mechanism, controlled by said keys, a machine frame, a character carrying member, a character displaying member, a shaft on said machine frame, said members being rotatably mounted on said shaft, a power driven shaft, a value generator, between said last named shaft and one of said members, coupling means being adapted to operate said printing mechanism and coupling said value generator with said power driven shaft.

31. In combination, a plurality of keys, printing mechanism, a generator, a driving shaft between said printing mechanism and said generator, means for carrying control characters, means for carrying algebraic signs, said last named means having staggered holes, means for transmitting motion from said generator to said character carrying member displaceable pins on said generator, setting means for said pins, and means for advancing said sign carrying member from one hole to another, said generator setting and advancing means being operated by said shaft upon depression of a key.

32. In combination, a plurality of keys, printing mechanism controlled by said keys, means coacting with said keys for determining control characters, means for automatically locking and unlocking said keys and manipulative means for selectively bringing said key lock into or out of operation.

33. In combination, a typewriter, a paper carriage, a housing extending over the whole length of said paper carriage, attachable to and removable from said carriage, two shafts, letter rollers on one of said shafts for each letter feed space of said carriage, operating gears for said letter rollers on the other of said shafts, an observation window for said letter rollers, a rake-like bail rotatable on said letter roller shaft for selectively excluding some of said letter rollers from observation and a manipulative member for operating said rake-like member.

34. In combination, a typewriter having a carriage return key, a control character determining means, comprising a single character carrying member, ciphering means comprising a plurality of character carrying members operative in opposite directions for addition and subtraction, respectively, a value generator common to said single character carrying member and said plurality of character carrying members, a driving connection between said value generator and said single character carrying member, a second driving connection between said value generator and said plurality of character carrying members, coupling means for selectively coupling said value generator with one or the other or with both of said driving connections, said second driving connection including a reversing gear, and means for controlling said coupling means and said reverse gear to operatively connect said plurality of character carrying members with said generator for addition or subtraction respectively.

35. In combination, a typewriter having a plurality of keys, printing mechanism, a driving member for operating said printing mechanism upon depression of said keys, control character determining means comprising a single character carrying member, ciphering means comprising a plurality of character carrying members operative in opposite directions for addition and subtraction respectively, a value generator in driving connection with said driving member and common to said single character carrying member and said plurality of character carrying members, a driving connection between said generator and said single character carrying member, a second driving connection between said generator and said plurality of character carrying members, coupling means for selectively coupling said generator with one or the other or with both of said driving connections, said second driving connection including a reversing gear, a series of controlling members for said coupling means and said reversing gear, connecting means between said series of controlling members and said coupling means and reversing gear, and means for bringing one of said controlling members into cooperative relation to said connecting means to cause the latter to establish driving connection between said generator and said plurality of character carrying members for operating the same for addition or subtraction.

36. In combination, a typewriter having a plurality of keys, printing mechanism, a value generator, a driving member for said printing mechanism and said generator, control character determining means comprising a single character carrying member, ciphering means comprising a plurality of character carrying members operative in opposite directions for addition and subtraction, respectively, a driving connection between said generator and said single character carrying member, a second driving connection between said generator and said plurality of character carrying members, coupling means for selectively coupling said generator with one or the other or with both of said driving connections, said second driving connection including a reversing gear, a plurality of cams, connections between said cams and said coupling means and reversing gears, said cams being slidably mounted, and means for bringing certain of said cams into cooperative relation to said connecting means to cause the latter to establish driving connection between said generator and said plurality of character carrying members for operating the same for addition or subtraction.

37. In combination, a typewriter having a plurality of keys, printing mechanism, a value generator, a driving member for said printing mechanism and said generator, control character determining means comprising a single character carrying member, cyphering means comprising a plurality of character carrying members operative in reverse directions respectively, a driving connection between said value generator and said single character carrying member, a second driving connection between said generator and said plurality of character carrying members, coupling means for selectively coupling said generator with one or the other or both of said driving connections, said second driving connection including a reversing gear, and means to shift said reversing gear and said coupling means to cause operation of said plurality of character carrying members and said single character carrying member and comprising a rotary shaft, a tube adjustable on said shaft, a plurality of pairs of cams fast on said tube for adjustment thereby to different positions, connecting means between said cams and said coupling means and reversing gear and operative by said pairs of cams in said different positions thereof, and means on said tube for adjusting the same.

38. In combination, a typewriter, a carriage, printing mechanism, a plurality of character carrying members on said carriage, a value generator, a continuously driven shaft for operating said printing mechanism and said value generator, a master wheel for said character carrying members operative by said generator, a reversing gear between said value generator and master wheel whereby said character carrying members are operative in opposite directions, and zero setting devices including a manipulative member for simultaneously setting said character carrying members to zero after movement thereof in either direction.

39. In combination, a typewriter, a carriage, a platen on said carriage, letter keys, printing mechanism for cooperation with said platen, a plurality of toothed character carrying members rotatable on said carriage, a master wheel for rotating said members seriatim, a value generator for operating said master wheel, a power driven shaft for operating said printing mechanism and generator under control of said keys, and a member having a complete gear and a plurality of mutilated gears thereon adapted to mesh with said character carrying members, respectively, said complete gear being related to one of said keys for operation through a complete revolution under control thereof and through the intermediary of the character carrying member with which said complete gear meshes and the master wheel and whereby all of said character carrying members are rotated differentially under control of said key.

40. In combination, a plurality of keys, a carriage, printing mechanism, a character carrying member rotatable in opposite directions, a rotatable character displaying member, a generator, a power driven shaft for operating said printing mechanism and said generator, driving means including a reversing gear between said generator and said character carrying member, and shiftable means between said printing mechanism and said character displaying member and reversing gear to cause rotation of said displaying member in uniform degree upon operation of any of said keys, said means shifting said reversing gear to cause rotation of said character carrying member alternately in opposite directions in degree corresponding to the key depressed.

41. In combination a typewriter, having keys, type levers, a continuously rotating type lever operating shaft, a control character determining device comprising a character carrying member, a second member for displaying a single character of said character carrying member, a value generator, and operating connections between said generator and said shaft controlled by said keys to cause said generator and said character carrying member to be actuated by said shaft on depression of said keys.

42. In combination, a plurality of keys, printing mechanism controlled by said keys, control character determining means, a power shaft, a coupling on said power shaft comprising a value generator interconnected with said character determining means, and a coupling half, means for operatively connecting said coupling half with said value generator on depression of said keys, means for locking said coupling half in operative condition, and means on said value generator settable on depression of said keys for releasing said locking means in accordance with the value of the key depressed.

HUGO KÄMMEL.